US011973259B2

(12) United States Patent
Hiramatsu et al.

(10) Patent No.: US 11,973,259 B2
(45) Date of Patent: Apr. 30, 2024

(54) ANTENNA UNIT, ANTENNA UNIT-EQUIPPED WINDOW GLASS, ATTACHMENT METHOD FOR ANTENNA UNIT

(71) Applicants: AGC Inc., Tokyo (JP); AGC GLASS EUROPE, Louvain-la-Neuve (BE); AGC FLAT GLASS NORTH AMERICA, INC., Alpharetta, GA (US); AGC Vidros do Brasil Ltda., Sao Paulo (BR)

(72) Inventors: Tetsuya Hiramatsu, Tokyo (JP); Mayu Ogawa, Tokyo (JP); Ryuta Sonoda, Tokyo (JP); Kentaro Oka, Tokyo (JP); Ken Ebihara, Tokyo (JP); Yuya Shimada, Tokyo (JP)

(73) Assignees: AGC Inc., Tokyo (JP); AGC GLASS EUROPE, Louvain-la-Neuve (BE); AGC FLAT GLASS NORTH AMERICA, INC., Alpharetta, GA (US); AGC Vidros do Brasil Ltda., Sao Paulo (BR)

( * ) Notice: Subject to any disclaimer, the term of this patent is extended or adjusted under 35 U.S.C. 154(b) by 229 days.

(21) Appl. No.: 17/443,198

(22) Filed: Jul. 22, 2021

(65) Prior Publication Data

US 2021/0351489 A1 Nov. 11, 2021

Related U.S. Application Data

(63) Continuation of application No. PCT/JP2020/003400, filed on Jan. 30, 2020.

(30) Foreign Application Priority Data

Feb. 6, 2019 (JP) ................................ 2019-020099

(51) Int. Cl.
*H01Q 1/12* (2006.01)
*H01Q 15/14* (2006.01)

(52) U.S. Cl.
CPC ........... *H01Q 1/1271* (2013.01); *H01Q 15/14* (2013.01)

(58) Field of Classification Search
CPC ...... H01Q 1/1271; H01Q 1/526; H01Q 15/14; H01Q 17/001; H01Q 19/104; E06B 7/28
See application file for complete search history.

(56) References Cited

U.S. PATENT DOCUMENTS

2017/0365908 A1* 12/2017 Hughes .................... H01Q 9/40
2019/0191599 A1* 6/2019 Kato ....................... B32B 27/10
(Continued)

FOREIGN PATENT DOCUMENTS

GB 2 272 579 A 5/1994
JP 3437993 B2 8/2003
(Continued)

*Primary Examiner* — Seokjin Kim
(74) *Attorney, Agent, or Firm* — Oblon, McClelland, Maier & Neustadt, L.L.P.

(57) ABSTRACT

An antenna unit to be used by being installed so as to face window glass of a building, the antenna unit including a radiating element, a reflective member configured to reflect electromagnetic waves radiated from the radiating element toward outside of the building, and a support unit configured to removably support the reflective member. An antenna unit attachment method includes installing an antenna unit so as to face window glass for a building, the antenna unit having a radiating element and a support unit, and supporting a reflective member that reflects electromagnetic waves radiated from the radiating element by the support unit on an outdoor side relative to the radiating element.

23 Claims, 18 Drawing Sheets

(56) References Cited

U.S. PATENT DOCUMENTS

| | | | |
|---|---|---|---|
| 2019/0319335 | A1 | 10/2019 | Hughes et al. |
| 2020/0321682 | A1 | 10/2020 | Hughes et al. |
| 2021/0119318 | A1 | 4/2021 | Hughes et al. |

FOREIGN PATENT DOCUMENTS

| | | | | |
|---|---|---|---|---|
| JP | 2008-199562 | A | | 8/2008 |
| JP | 4838053 | B2 | | 12/2011 |
| JP | 2014-165599 | A | | 9/2014 |
| JP | 2018110465 | A | * | 7/2018 |
| KR | 20090015995 | A | * | 2/2009 |

* cited by examiner

ANTENNA UNIT, ANTENNA UNIT-EQUIPPED WINDOW GLASS, ATTACHMENT METHOD FOR ANTENNA UNIT

CROSS-REFERENCE TO RELATED APPLICATIONS

This application is a continuation of International Application PCT/JP2020/003400, filed on Jan. 30, 2020 and designated the U.S., which is based on and claims priority to Japanese Patent Application No. 2019-020099 filed on Feb. 6, 2019, with the Japan Patent Office. The entire contents of these applications are incorporated herein by reference.

BACKGROUND OF THE INVENTION

1. Field of the Invention

The present disclosure relates to an antenna unit, antenna unit-equipped window glass, and an attachment method for the antenna unit.

2. Description of the Related Art

Various communication systems utilizing wireless technology such as mobile phones, Internet communication, a radio broadcast, the global positioning system (GPS), and the like are being developed. Supporting these communication systems requires an antenna that is capable of transmitting and receiving electromagnetic waves used by the respective communication systems.

As an antenna unit used by being installed on an outer wall of a building, for example, an antenna unit using a radio wave transmission structure that includes three layers each having a different relative dielectric constant, has a predetermined thickness for each layer, and has good radio wave transmission performed, has been proposed (see PTL 1).

CITATION LIST

Patent Literature

[PTL 1] Japanese Patent No. 3437993

SUMMARY OF THE INVENTION

In general, it is not preferable for people to be excessively exposed to electromagnetic waves. There is demand for the electromagnetic waves radiated toward the outside of the building from the antenna unit to be reduced such that a person outside of the building (a person cleaning window glass from outside of the building (window washing, for example)) is not excessively exposed to the electromagnetic waves.

There may be a need to provide an antenna unit, antenna unit-equipped glass, and an attachment method of the antenna unit capable of temporarily reducing the electromagnetic waves radiated toward the outside of the building.

According to one aspect of the present disclosure, an antenna unit and window glass equipped with the antenna unit are provided. The antenna unit is to be used by being installed so as to face window glass for a building and includes a radiating element, a reflective member configured to reflect electromagnetic waves radiated from the radiating element toward outside of the building, and a support unit configured to removably support the reflective member.

Further, according to another aspect of the present disclosure, an antenna unit attachment method that includes installing an antenna unit so as to face window glass for a building, the antenna unit having a radiating element and a support unit, and supporting a reflective member that reflects electromagnetic waves radiated from the radiating element by the support unit on an outdoor side relative to the radiating element, is provided.

According to at least one embodiment of the present disclosure, an antenna unit, antenna unit-equipped window glass, and an antenna unit attachment method capable of temporarily reducing the electromagnetic waves radiated toward the outside of a building can be provided.

DESCRIPTION OF THE PREFERRED EMBODIMENTS

Figure 1:
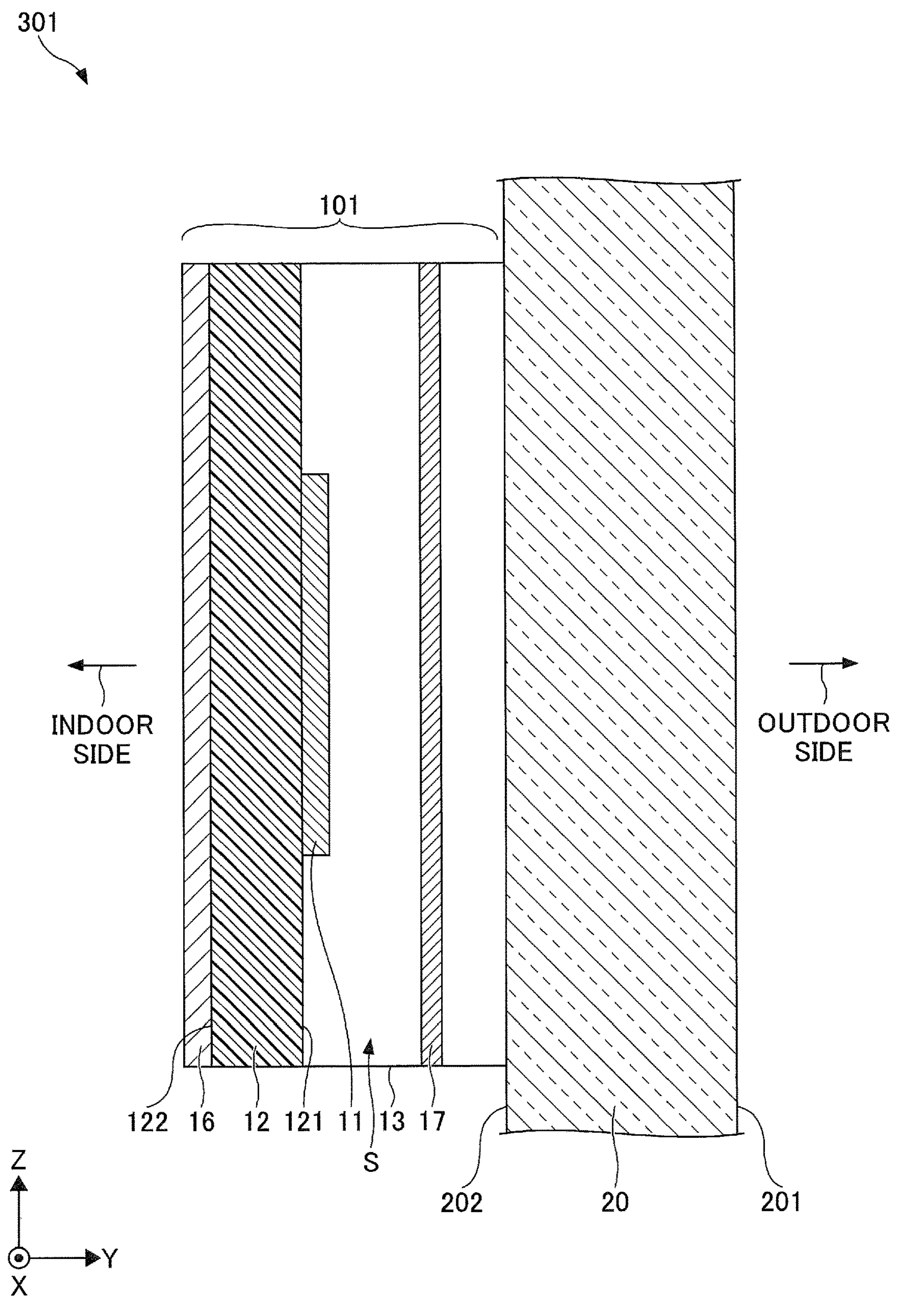
FIG. 1 is a cross-sectional view schematically illustrating an example of a layered configuration of antenna unit-equipped window glass according to a first embodiment.

In the following, embodiments of the present disclosure will be described in detail. In order to facilitate understanding, constituent elements illustrated in the drawings might not be to scale. In this specification, the three-dimensional orthogonal coordinate system using three axes (X-axis direction, Y-axis direction, and Z-axis direction) is used. The width direction of the glass sheet is defined as the X-axis direction, the thickness direction of the glass sheet is defined as the Y-axis direction, and the height direction is defined as the Z-axis direction. The upward direction from the bottom of the glass sheet is defined as the +Z-axis direction (positive Z-axis direction), whereas the opposite direction is defined as the −Z-axis direction (negative Z-axis direction). In the description below, the +Z-axis direction and the −Z-axis direction may be used.

The X-axis direction, the Y-axis direction, and the Z-axis direction represent a direction parallel to the X axis, a direction parallel to the Y axis, and a direction parallel to the Z axis, respectively. The X-axis direction, the Y-axis direction, and the Z-axis direction are orthogonal to each other. The XY plane, the YZ plane, and the ZX plane are a virtual plane parallel to the X-axis direction and the Y-axis direction, a virtual plane parallel to the Y-axis direction and the Z-axis direction, and a virtual plane parallel to the Z-axis direction and the X-axis direction, respectively.

FIG. 1 is a cross-sectional view schematically illustrating an example of a layered configuration of antenna unit-equipped window glass according to a first embodiment. Antenna unit-equipped window glass 301 illustrated in FIG. 1 includes an antenna unit 101 and window glass 20. The antenna unit 101 is used by being installed so as to face an indoor-side surface of the window glass 20 for a building.

The window glass 20 is a glass sheet used as a window for a building, for example. The window glass 20 is formed in a rectangle shape as viewed in a plan view in the Y-axis direction, and has a first glass surface 201 and a second glass surface 202, for example. The thickness of the window glass 20 is set in accordance with the required technical specifications of a building or the like. In the present embodiment, the first glass surface 201 of the window glass 20 serves as the outdoor-side surface, whereas the second glass surface 202 of the window glass 20 serves as the indoor-side surface. In the present embodiment, the first glass surface 201 and the second glass surface 202 may be collectively referred to simply as the main surface. In the present embodiment, the term "rectangle" includes a rectangle, a square, and a shape of a rectangle or square with chamfered corners. The shape of the window glass 20 in a plan view is not limited to a rectangle, and may be of another shape such as a circle. Also, the window glass 20 is not limited to a single sheet, and may be laminated glass or multi-layered glass.

Examples of the materials of the window glass 20 include, for example, soda-lime-silica glass, borosilicate glass, aluminosilicate glass, and alkali-free glass.

The antenna unit 101 is a device used by being attached to the indoor side of the window glass 20 for the building, and transmits and receives electromagnetic waves via the window glass 20. The antenna unit 101 is formed so as to be capable of transmitting and receiving electromagnetic waves corresponding to wireless communication standards such as 5th generation mobile communication systems (commonly referred to as 5G), Bluetooth (registered trademark), and wireless local area network (LAN) standards such as IEEE 802.11ac. The antenna unit 101 may be formed so as to be capable of transmitting and receiving electromagnetic waves corresponding to other standards, and may be formed so as to be capable of transmitting and receiving electromagnetic waves of different frequencies. The antenna unit 101 can be utilized as, for example, a wireless base station, used by being made to face the window glass 20.

In the embodiment illustrated in FIG. 1, the antenna unit 101 includes a radiating element 11, a reflective member 17, and a support unit 13.

The antenna unit 101 is attached to the second glass surface 202 of the window glass 20 such that a space S is formed between the radiating element 11 and the second glass surface 202 of the window glass 20 by the support unit 13.

The radiating element 11 is an antenna conductor formed to be capable of transmitting and receiving electromagnetic waves in a desired frequency band. Examples of desired frequency bands include an ultra high frequency (UHF) band with a frequency of 0.3 to 3 GHz, a super high frequency (SHF) band with a frequency of 3 to 30 GHz, and an extremely high frequency (EHF) band with a frequency of 30 to 300 GHz. The radiating element 11 functions as a radiating device (radiator). The radiating element 11 may be a single antenna element or may include multiple antenna elements of which the feeding points are different from each other.

The reflective member 17 is a shield member that reflects electromagnetic waves (radio waves for 5G) reflected toward the outside of the building from the radiating element 11. The reflective member 17, while being supported at a predetermined installation location on an outdoor side relative to the radiating element 11 by the support unit 13, reflects electromagnetic waves radiated toward the outside of the building from the radiating element 11. In the embodiment illustrated in FIG. 1, the installation location is between the radiating element 11 and the second glass surface 202 of the window glass 20.

The support unit 13 removably supports the reflective member 17 from the predetermined installation location on the outdoor side relative to the radiating element 11. In the embodiment illustrated in FIG. 1, the support unit 13 removably supports the reflective member 17 placed at the installation location between the radiating element 11 and the second glass surface 202 of the window glass 20. For example, the support unit 13 removably supports the reflective member 17 from a gap that exists in a Z-axis direction, an X-axis direction, or both.

As described, the antenna unit 101 includes a reflective member 17 that reflects electromagnetic waves radiated toward the outside of the building from the radiating element 11 and includes the support unit 13 that removably supports the reflective member 17. Therefore, when it is not favorable to radiate electromagnetic waves toward the outside of the building (when a person who is cleaning the window glass 20 from the outside of the building is not to be exposed to electromagnetic waves, for example), the electromagnetic waves radiated toward the outside of the building are blocked by the reflective member 17 supported by the support unit 13. This ensures that the amount of electromagnetic waves, radiated toward the outside of the building from the radiating element 11, to which the person is exposed, is reduced. Conversely, during regular operations of the antenna unit 101, the reflective member 17 can be removed such that the electromagnetic waves radiated toward the outside of the building are not reflected by the reflective member 17, and thus the electromagnetic waves radiated toward outside of the building are able to be radiated. In this manner, when it is not favorable to radiate electromagnetic waves toward the outside of the building, the electromagnetic waves radiated toward the outside of the building can be temporarily reduced.

Also, the attachment method of the antenna unit according to the present disclosure is a method by which the antenna unit 101 including the radiating element 11 and the support unit 13 is installed so as to face the window glass 20 for a building, and the reflective member 17 that reflects electromagnetic waves radiated from the radiating element 11 is supported by the support unit 13 on the outdoor side relative to the radiating element 11. With this method, electromagnetic waves radiated toward the outside of the building can be temporarily reduced.

In the embodiment illustrated in FIG. 1, although the antenna unit 101 is fixed to the window glass 20 by the support unit 13, this fixed construction is not limited. Alternatively, the antenna unit 101 also can be suspended from a ceiling or can be fixed to a protrusion (for example, a window frame, window sash, or the like that holds the outer edges of the window glass 20) surrounding the window glass 20, so as to be used by being installed so as to face the window glass 20. Further, the antenna unit 101 may be installed so as to contact the window glass 20, or may be installed so as to be in close proximity to but not contacting the window glass 20.

Next, the embodiment illustrated in FIG. 1 is described in greater detail.

The antenna unit 101 includes the radiating element 11, a substrate 12, a conductor 16, the reflective member 17, and the support unit 13.

The radiating element 11 is provided on a first main surface 121 of the substrate 12. The radiating element 11 may be formed by printing metal material so as to overlap at least a portion a ceramic layer provided on the first main surface 121 of the substrate 12. This ensures that the radiating element 11 is provided on the first main surface 121 of the substrate 12 and straddles a portion where the ceramic layer is formed and a portion where the ceramic layer is not formed.

A conductive material such as gold, silver, copper, platinum, and the like can be used as a material forming the radiating element 11. Also, a patch antenna, a dipole antenna, or the like can be used with the radiating element 11.

Examples of other materials that form the radiating element 11 include fluorine doped tin oxide (FTO), indium tin oxide (ITO), and the like.

The aforementioned ceramic layer can be formed on the first main surface 121 of the substrate 12 by printing or the like. By providing the aforementioned layer, wiring (not illustrated) that is attached to the radiating element 11 can be masked for a better design. In the present embodiment, the ceramic layer need not be provided on the first main surface 121, and may be provided on the second main surface 122 of the substrate 12. By providing the ceramic layer on the first main surface 121 of the substrate 12, the radiating element 11 and the ceramic layer can be provided on the substrate 12 by printing in the same step and this is preferable.

The material of the ceramic layer is glass frit or the like and the thickness is preferably 1 to 20 μm.

In the present embodiment, although the radiating element 11 is provided on the first main surface 121 of the substrate 12, the radiating element 11 may instead be provided inside the substrate 12. In this case, the radiating element 11 can be provided in a coiled form inside the substrate 12, for example.

In the case where the substrate 12 is laminated glass that includes a pair of glass sheets and a resin layer provided between the pair of glass sheets, the radiating element 11 may be provided between the resin layer and either one of the glass sheets included in the laminated glass.

Also, regarding the radiating element 11, the radiating element 11 itself may be formed as a flat plate. In this case, the flat-plate radiating element 11 may be configured to be attached directly to the support unit 13 without use of the substrate 12.

Besides being provided on the substrate 12, the radiating element 11 may be provided inside a storage receptacle. In such a case, the radiating element 11 can be provided inside the aforementioned storage receptacle as the radiating element 11 in a plate shape. The storage receptacle is not limited to a specific shape, and may be a rectangle shape. The substrate 12 may be a portion of the storage receptacle.

The radiating element 11 has optical transparency. As long as the radiating element 11 is has optical transparency the design is good, and furthermore the average solar absorptivity can be reduced. The visible light transmittance of the radiating element 11 is preferably 40% or more. A visible light transmittance of the radiating element 11 that is 60% or more is preferable so that the function of the window glass in terms of transparency can be maintained. The visible light transmittance can be obtained in Japanese Industrial Standard JIS R 3106 (1998).

The radiating element 11 is preferably formed as a mesh with optical transparency. The term "mesh" refers to a state in which mesh-like through holes are formed on the plane of the radiating element 11.

In a case where the radiating element 11 is formed as a mesh, the openings of the mesh may be rectangle or diamond shaped. The line width of the mesh is preferably 5 to 30 μm, and more preferably 6 to 15 μm. The line space of the mesh is preferably 50 to 500 μm, and more preferably 100 to 300 μm.

The percentage of openings in the radiating element 11 is preferably 80% or more, and more preferably 90% or more. The percentage of openings of the radiating element 11 is a percentage of the area of the openings per entire area of the radiating element 11 including the openings formed in the radiating element 11. The greater the percentage of openings of the radiating element 11 is, the higher the visible light transmittance of the radiating element 11.

The thickness of the radiating element 11 is preferably 400 nm or less, and more preferably 300 nm or less. The lower limit of the thickness of the radiating element 11 is not particularly limited, and may be 2 nm or more, may be 10 nm or more, or may be 30 nm or more.

Also, in a case where the radiating element 11 is formed as a mesh, the thickness of the radiating element 11 may be 2 to 40 μm. By forming the radiating element 11 as a mesh, a high visible light transmittance can be achieved even when the radiating element 11 is thick.

The substrate 12 is, for example, a substrate provided parallel to the window glass 20. The substrate 12 is formed in a rectangle, for example, in a plan view, and includes the first main surface 121 and the second main surface 122. The first main surface 121 is provided so as to face toward the outdoor side, and in the embodiment illustrated in FIG. 1, is provided so as to face the second glass surface 202 of the window glass 20. The second main surface 122 is provided so as to face toward the indoor side, and in the embodiment illustrated in FIG. 1, is provided so as to face in the same direction the second glass surface 202 is facing.

In the present embodiment, the substrate 12 or the radiating element 11 may be provided so as to be at a predetermined angle with respect to the window glass 20. The antenna unit 101 has a glass-facing surface that is a surface on the side facing the window glass 20. The antenna unit 101 may be provided such that the glass-facing surface has a predetermined angle with respect to the window glass 20. The glass-facing surface may be a surface of the substrate 12 or the radiating element 11, or may be an outer surface of the antenna unit 101 itself. There is a case where the antenna unit 101 radiates electromagnetic waves, while the glass-facing surface is tilted at a predetermined tilt angle with respect to the surface of the window glass 20 (the second glass surface 202, for example). For example, there is a case where the antenna unit 101 is installed on window glass or the like of a building at a position higher than a ground surface and emits electromagnetic waves toward the ground surface in order to form an area on the ground surface. The angle between the glass-facing surface (the first main surface 121 of the substrate 12, for example) and the surface of the window glass 20 (the second glass surface 202, for example) may be 0 degrees or more, may be 5 degrees or more, or may be 10 degrees or more so that a good direction for transmitting radio waves can be achieved. Also, in order to transmit radio waves to the outside of the building, the angle between the glass-facing surface (the first main surface 121 of the substrate 12, for example) and the surface of the window glass 20 (the second glass surface 202, for example) may be 50 degrees or less, 30 degrees or less, or 20 degrees or less.

The material forming the substrate 12 is designed in accordance with an antenna performance required by the radiating element 11, examples of antenna performance being power, directivity, and the like. Examples of the materials forming the substrate 12 include metal, or a dielectric such as glass, resin, or the like, or a composite of these. The substrate 12 may be formed of a dielectric such as resin or the like so as to have optical transparency. The forming of the substrate 12 with materials having optical transparency ensures that any blockage by the substrate 12 of the view visible beyond the window glass 20 is reduced.

In a case where the substrate 12 is used as glass, examples of the materials of the glass include soda-lime-silica glass, borosilicate glass, aluminosilicate glass, and alkali-free glass.

The glass sheet used as the substrate 12 can be manufactured by a publicly-known manufacturing process such as a float process, a fusion process, a redraw process, a press-forming process, or a lifting process. A float process is preferable as the manufacturing process of the glass sheet because it is superior in terms of mass productivity and cost performance.

In a plan view, the glass is formed as a rectangle. A cutting method of the glass sheet can be a method of cutting by emitting a laser beam onto the surface of the glass sheet and moving the laser beam emission region on the surface of the glass sheet, or can be a method of cutting mechanically with a cutter wheel or the like.

In the present embodiment, the term "rectangle" includes a rectangle, a square, and a shape of a rectangle or square with rounded edges. A shape of the glass sheet in a plan view is not limited to a rectangle, and may be of another shape such as a circle. Also, the glass sheet is not limited to a single sheet, and may be of another shape laminated glass or multi-layered glass.

In a case where resin is used as the substrate 12, the resin is preferably a transparent resin such as a liquid crystal polymer (LCP), polyimide (PI), polyphenylene ether (PPE), polycarbonate, an acrylic resin, a fluorine resin, or the like. The fluorine resin is preferable in that the permittivity is low.

The fluorine resin can be an ethylene tetrafluoroethylene (which will hereinafter also be referred to as "ETFE"), a hexafluoropropylene-tetrafluoroethylene copolymer (which will hereinafter also be referred to as "FEP"), a tetrafluoroethylene-propylene copolymer, a tetrafluoroethylene-hexafluoropropylene-propylene copolymer, a perfluoro (alkyl vinyl ether)-tetrafluoroethylene copolymer (which will hereinafter also be referred to as "PFA"), a tetrafluoroethylene-hexafluoropropylene-vinylidene fluoride copolymer (which will hereinafter also be referred to as "THV"), polyvinylidene fluoride (which will hereinafter also be referred to as "PVDF"), a vinylidene fluoride-hexafluoropropylene copolymer, polyvinyl fluoride, chlorotrifluoroethylene polymer, ethylene-chlorotrifluoroethylene copolymer (which will hereinafter also be referred to as "ECTFE"), or polytetrafluoroethylene, for example. Any of these may be used alone, or two or more may be used in combination.

The fluorine resin is preferably at least one selected from a group including ETFE, FEP, PFA, PVDF, ECTFE, and THV, and particularly preferably ETFE because it is superior in terms of transparency, processability, and weather resistance.

The fluorine resin may be AFLEX (registered trademark).

The thickness of the substrate 12 is preferably 25 μm to 10 mm. The thickness of the substrate 12 can be designed as suited in accordance with the place where the radiating element 11 is to be placed.

In a case where the substrate 12 is a resin, a resin formed in a film or sheet is preferred. The thickness of the film or sheet is preferably from 25 to 1000 μm, more preferably 100 to 800 μm, and particularly preferably 100 to 500 μm so that the strength for holding the antenna is superior.

In a case where the substrate 12 is glass, the thickness of the substrate 12 is preferably 1.0 to 10 mm with respect to the strength of holding the antenna.

The arithmetic average roughness Ra of the first main surface 121 of the substrate 12 is preferably 1.2 μm or less. Reason being, when the arithmetic average roughness Ra of the first main surface 121 is 1.2 μm or less, air can easily flow in space S formed between the substrate 12 and the window glass 20, which is described further below. The arithmetic average roughness Ra of the first main surface 121 is more preferably 0.6 μm or less, and even more preferably 0.3 μm or less. The lower limit of the arithmetic average roughness Ra is, for example, 0.001 μm, although the lower limit is not particularly limited.

The arithmetic average roughness Ra can be measured based on the Japanese Industrial Standard JIS B0601:2001.

In a case where the radiating element 11 is a flat plate, the arithmetic average roughness Ra of the glass sheet-facing main surface of the radiating element 11 is preferably 1.2 μm or less, more preferably 0.6 μm or less, and even more preferably 0.3 μm or less. Also, in a case where the radiating element 11 is provided inside the storage receptacle, the arithmetic average roughness Ra of the glass sheet-facing main surface of the radiating element 11 is preferably 1.2 μm or less, more preferably 0.6 μm or less, and even more preferably 0.3 μm or less. The lower limit of the arithmetic average roughness Ra is, for example, 0.001 μm, although the lower limit is not particularly limited.

The antenna unit 101 may include the conductor 16 provided on the second main surface 122 of the substrate 12, the second main surface 122 facing a direction opposite to the window glass 20. Although the conductor 16 is provided on the indoor side relative to the radiating element 11, the antenna unit 101 may be without the conductor 16. The conductor 16 is an electromagnetic shielding layer that can reduce electromagnetic interference between electromagnetic waves transmitted from indoor electronic devices and electromagnetic waves radiated from the radiating element 11. The conductor 16 may be a single layer or may be multilayered. A publicly-known material can be used as the conductor 16. For example, a metal film of copper, tungsten, or the like, or a transparent substrate using a transparent conductive film can be used.

As the transparent conductive film, indium tin oxide (ITO), fluorine doped tin oxide (FTC)), indium zinc oxide (IZO), indium tin silicon oxide (ITSO), zinc oxide (ZnO), or a conductive material that has translucency such as an Si compound including P or B can be used.

The conductor 16 is preferably formed as a mesh in order to have optical transparency. Here, the term "mesh" refers to a state in which mesh-like through holes are formed on the plane of the conductor 16. In a case where the conductor 16 is formed as a mesh, the openings of the mesh may be rectangle or diamond shaped. The line width of the mesh is preferably 5 to 30 μm, and more preferably 6 to 15 μm. The line space of the mesh is preferably 50 to 500 μm, and more preferably 100 to 300 μm.

A publicly-known method can be used as the method for forming the conductor 16. For example, a sputtering method, a vapor deposition method, or the like can be used.

The surface resistivity of the conductor 16 is preferably 20Ω/□ (ohms per square) or less, more preferably 10Ω/□ or less, and even more preferably 5Ω/□ or less. The size of the conductor 16 is preferably greater than or equal to the size of the substrate 12. By providing the conductor 16 on side of the second main surface 122 of the substrate 12, the transmission of radio waves to the inside of the building can be suppressed. The surface resistivity of the conductor 16 depends on the thickness, the material, and a percentage of openings of the conductor 16. The percentage of openings is a percentage of the area of the openings per entire area of the conductor 16 including the openings formed in the conductor 16.

The visible light transmittance of the conductor 16 is preferably 40% or more, and more preferably 60% or more to enhance the design. Also, in order to suppress the transmission of radio waves to inside the building, the visible light transmittance of the conductor 16 is preferably 90% or less, and more preferably 80% or less.

Also, the greater the percentage of openings of conductor 16, the higher the visible light transmittance. The percentage of openings of the conductor 16 is preferably 80% or more, and more preferably 90% or more. Also, in order to suppress the transmission of radio waves to the inside of the building, the percentage of openings of the conductor 16 is less than 95%.

The thickness of the conductor 16 is preferably 400 nm or less, and more preferably 300 nm or less. The lower limit of the thickness of the conductor 16 is not particularly limited, and may be 2 nm or more, may be 10 nm or more, or may be 30 nm or more.

In a case where the conductor 16 is formed as a mesh, the thickness of the conductor 16 may be 2 to 40 μm. By forming the conductor 16 as a mesh, a hick visible light transmittance can be achieved even when the conductor 16 is thick.

The reflective member 17 may be any conductive material such as metal, carbon, indium tin oxide (ITO), and fluorine doped tin oxide (FTC)). Examples of the metal include copper, gold, silver, platinum, and the like. Also, the reflective member 17 may have translucency.

The reflective member 17 may be configured by multiple linear reflective elements. In a case where the reflective member 17 is configured by multiple linear reflective elements, the reflective elements are preferably arranged in a stripe or lattice array, and the reflective elements are preferably arranged along a direction of polarization planes of electromagnetic waves radiated from the radiating element 11.

The surface resistivity of the reflective member 17 is preferably 20Ω/□ or less, more preferably 10Ω/□ or less, and even more preferably 5Ω/□ or less. By setting the range as such, the electromagnetic waves can be appropriately reflective as compared to when set to outside of any of these ranges. The size of the reflective member 17 is preferably greater than or equal to the size of the substrate 12.

The substrate 12 is fixed to the window glass 20 such that the support unit 13 forms a space S enabling installation of the reflective member 17 between the window glass 20 and the substrate 12 (radiating element 11). The support unit 13 supports the outer edges of the substrate 12. The white region (region between the substrate 12 and the window glass 20) illustrated in FIG. 1 does not represent a cross-section of the support unit 13, but instead represents inner surfaces of the support unit 13 defining the space S. For example, the support unit 13 is provided at both ends of the substrate 12 in the X-axis direction in a rectangle shape along the Z-axis direction.

The support unit 13 may support the substrate 12 such that the space S where air can flow between the window glass 20 and the substrate 12 is formed. By forming the space S where air can flow between the window glass 20 and the substrate 12, a localized rise in surface temperature of the window glass 20 that faces the substrate 12 can be suppressed.

When sunlight shines on the outer-side main surface of the window glass 20, the window glass 20 heats up. At this time, if the flow of air were to be blocked near the antenna unit 101, the temperature of the antenna unit 101 would rise, and consequently the temperature of the surface of the window glass 20 to which the antenna unit 101 is attached would tend to rise more easily than the other surface of the window glass 20. In order to suppress such a temperature rise, the space S is preferably formed between the window glass 20 and the substrate 12.

The material forming the support unit 13 is not particularly limited as long as a material can fix the support unit 13 to contact surfaces of the substrate 12 and the window glass 20, and an adhesive or an elastic sealing material can be used. As the material forming the adhesive or sealing material, a publicly-known resin such as a silicone-based resin, a polysulfide-based resin, an acrylic-based resin, or the like can be used. Also, the support unit 13 may use a spacer formed by a metal such as aluminum or formed by a resin such as an acrylonitrile ethylene styrene copolymer (AES). In the case where a spacer is used, the spacer is fixed to the contact surfaces of the substrate 12 and the window glass 20 by an adhesive such as a silicone sealant.

The average thickness t of the support unit 13 is preferably from 0.5 mm to 100 mm. If the average thickness t is too low, the thickness of the space S formed by the substrate 12 and the window glass 20 is low (thin), and consequently the reflective member 17 cannot be readily removed, and air cannot flow smoothly in the space S. With a minute space S set between the substrate 12 and the window glass 20, although the thickness of the space S becomes thinner, the space S can function as an insulating layer. Also, even if the thickness of the space S is minute, air can still flow to an extent. That is, when the sun shines on the window glass 20, the temperature of the window glass 20 rises and the temperature of the air inside the space S also rises. Also, the more the temperature of the air rises, the more the air expands, and as a result, air in the upper region of the space S rises and flows outside from the upper side of the space S. Also, the air from the lower region of the space S successively rises. Therefore, even when the thickness of the space S is minute, air tends to flow as the temperature of the air inside the space S rises.

Conversely, if the average thickness t of the support unit 13 is increased, space S widens accordingly (becomes thicker), and thus reflective member 17 can be easily removed and air can flow well inside the space S. However, since the distance between a main surface of the window glass 20 and the substrate 12 widens (increases), this may interfere with the transmission performance of electromagnetic waves. Moreover, as the antenna unit 101 would protrude greatly from the main surface of the window glass 20, the antenna unit 101 would become an obstacle to the window glass 20.

As long as the average thickness t of the support unit 13 is within one of the aforementioned ranges, air that flows into the space S can flow through the space S thanks to the small temperature rise, without compromising the removability of the reflective member 17. Thus, the heating-up of the window glass 20 can be suppressed due to the air that passes through the space S, and an excessive temperature rise of the first main surface 121 of the substrate 12 can be suppressed without compromising the removability of the reflective member 17.

In order to suppress thermal cracking, the average thickness t of the support unit 13 may be 2 mm or more, may be 4 mm or more, may be 6 mm or more, may be 15 mm or more, may be 20 mm or more, may be 30 mm or more, or may be 50 mm or more. Also, in order to enhance design, the average thickness t of the support unit 13 may be 80 mm or less, may be 60 mm or less, or may be 55 mm or less.

In the present embodiment, the term "thickness" refers to the length in a direction (Y-axis direction) perpendicular to support unit 13 with respect to the contact surfaces of the substrate 12 and the window glass 20. In the present embodiment, the expression "average thickness t of the support unit 13" refers to the average value of the thickness of the support unit 13. For example, in a cross-section of the support unit 13, when measurement is performed at multiple given locations (about three locations, for example) in the Z-axis direction, the average thickness t refers to the average value of the thickness measured at the given locations.

When the substrate 12 forms a specific angle with respect to the window glass 20, the support unit 13 may be a trapezoid shape in the cross section.

In the present embodiment illustrated in FIG. 1, although the antenna unit 101 is attached to the window glass 20 in a state where the substrate 12 and the support unit 13 are integrated together, this is not limited. For example, after only the support unit 13 is attached to the window glass 20 in advance, the substrate 12 may be attached to the support unit 13, and then the antenna unit 101 may be completed while on the window glass 20.

Figure 2:
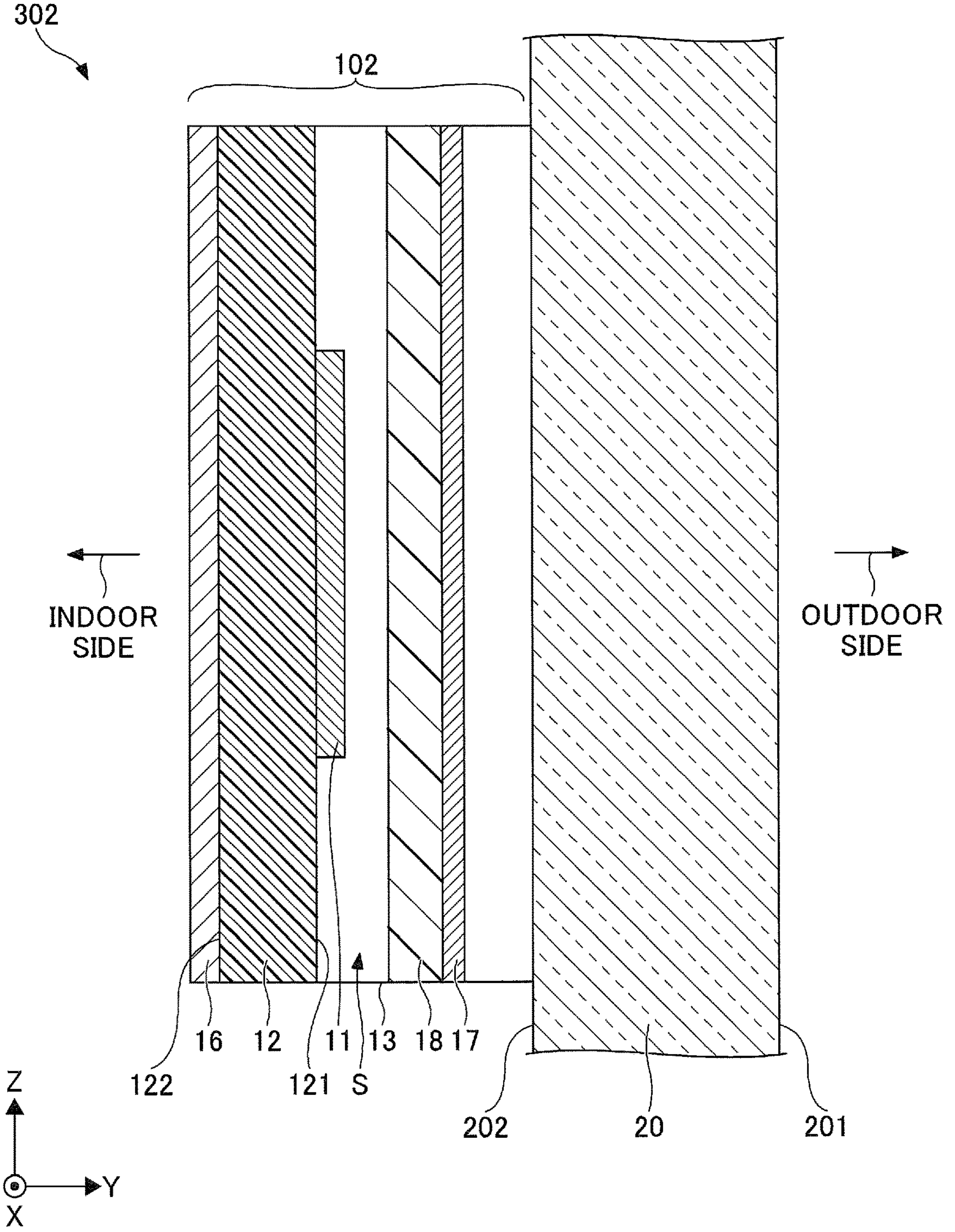
FIG. 2 is a cross-sectional view schematically illustrating an example of a layered configuration of antenna unit-equipped window glass according to a second embodiment.

FIG. 2 is a cross-sectional view schematically illustrating an example of a layered configuration of antenna unit-equipped window glass according to a second embodiment. Antenna unit-equipped window glass 302 illustrated in FIG. 2 includes an antenna unit 102 and the window glass 20. Any description regarding the same configuration or effect as in the above embodiment is omitted or simplified by referring to an aforementioned description.

The embodiment illustrated in FIG. 2 differs from FIG. 1 in that an absorber 18 is included between the radiating element 11 and the reflective member 17. The antenna units in other embodiments disclosed in this specification may also include the absorber 18.

The absorber 18 absorbs electromagnetic waves radiated toward the outside of the building from the radiating element 11. With the inclusion of the absorber 18, the degree to which the electromagnetic waves radiated toward the outside of the building are reduced increases even more. The absorber 18 may be a conductor, may be a dielectric, or may be a magnetic body. The absorber is also referred to as an electromagnetic absorber.

Any material can be used as the absorber 18 as long as the material has dielectric loss or magnetic loss in accordance with a frequency of the electromagnetic waves radiated from the radiating element 11. Examples of the material include fibers, particles, or foil of carbon, metal, or alloy, or tiles or particles of ferrite (sintered body), or the like dispersed in resin, synthetic rubber, cement or the like (including foamed urethane, foamed styrol, autoclaved lightweight concrete (ALC), and foamed glass). Also, a composite structure of these materials or a layered structure of these materials may be used. Also, the absorber 18 may be a structure of conductive fibers woven into a mesh, or may be a glass or plastic coated with a conductive thin film such as ITO, FTO, silver, or the like.

The distance between the absorber 18 and the reflective member 17 preferably satisfies $(\lambda/4+(\frac{1}{2})n\lambda-\lambda/8)$ to $(\lambda/4+(\frac{1}{2})n\lambda+\lambda/8)$. Here, A is the wavelength of an electromagnetic wave radiated from the radiating element 11, whereas n is any integer. Also, the input impedance as viewed on the indoor side of the absorber 18 is preferably from 197 to 557Ω/□, more preferably from 300 to 430Ω/□, even more preferably from 350 to 400Ω/□, and particularly preferably 377 Ω/□. 377Ω/□ is the characteristic impedance of air.

The absorber 18 may include a plurality of linear electromagnetic absorbing elements. In a case where the absorber 18 includes a plurality of linear electromagnetic absorbing elements, the electromagnetic absorbing elements are preferably arranged in a stripe or lattice array, and the electromagnetic absorbing elements are preferably arranged along a direction of polarization of electromagnetic waves radiated from the radiating element 11. In a case where dielectric loss bodies are used as the electromagnetic absorbing elements, the electromagnetic absorbing elements are preferably arranged in the electric field direction. In a case where magnetic loss bodies are used as the electromagnetic absorbing elements, the electromagnetic absorbing elements are preferably arranged in the magnetic field direction.

Also, in the embodiment illustrated in FIG. 2, the absorber 18 is situated between the reflective member 17 and the conductor 16. By doing so, the electromagnetic waves radiated from the radiating element 11 are multi-reflected between the reflective member 17 and the conductor 16, and thus a sufficient propagation distance in the absorber 18 can be obtained and electromagnetic waves can be sufficiently absorbed even if the absorber 18 has a relatively low radio wave absorption performance. Since the absorber 18 with a relatively low radio wave absorption performance is made useable, an inexpensive absorber 18 can be employed, thereby lowering the cost of the antenna unit.

The absorber 18 has an incidence surface upon which electromagnetic waves radiated from the radiating element 11 are incident, and a contact surface that contacts the reflective member 17. The absorber 18, for example causes the phase of the electromagnetic waves reflected to the indoor side by the incidence surface and the phase of the electromagnetic waves reflected to the indoor side by the reflective member 17 to be reversed, thereby reducing the reflection by the incidence interface, causing electromagnetic waves to propagate in the medium of the absorber 18, and causing the electromagnetic waves to be dampened and absorbed. The workings by which the absorber 18 absorbs electromagnetic waves is not limited to this.

Figure 3:
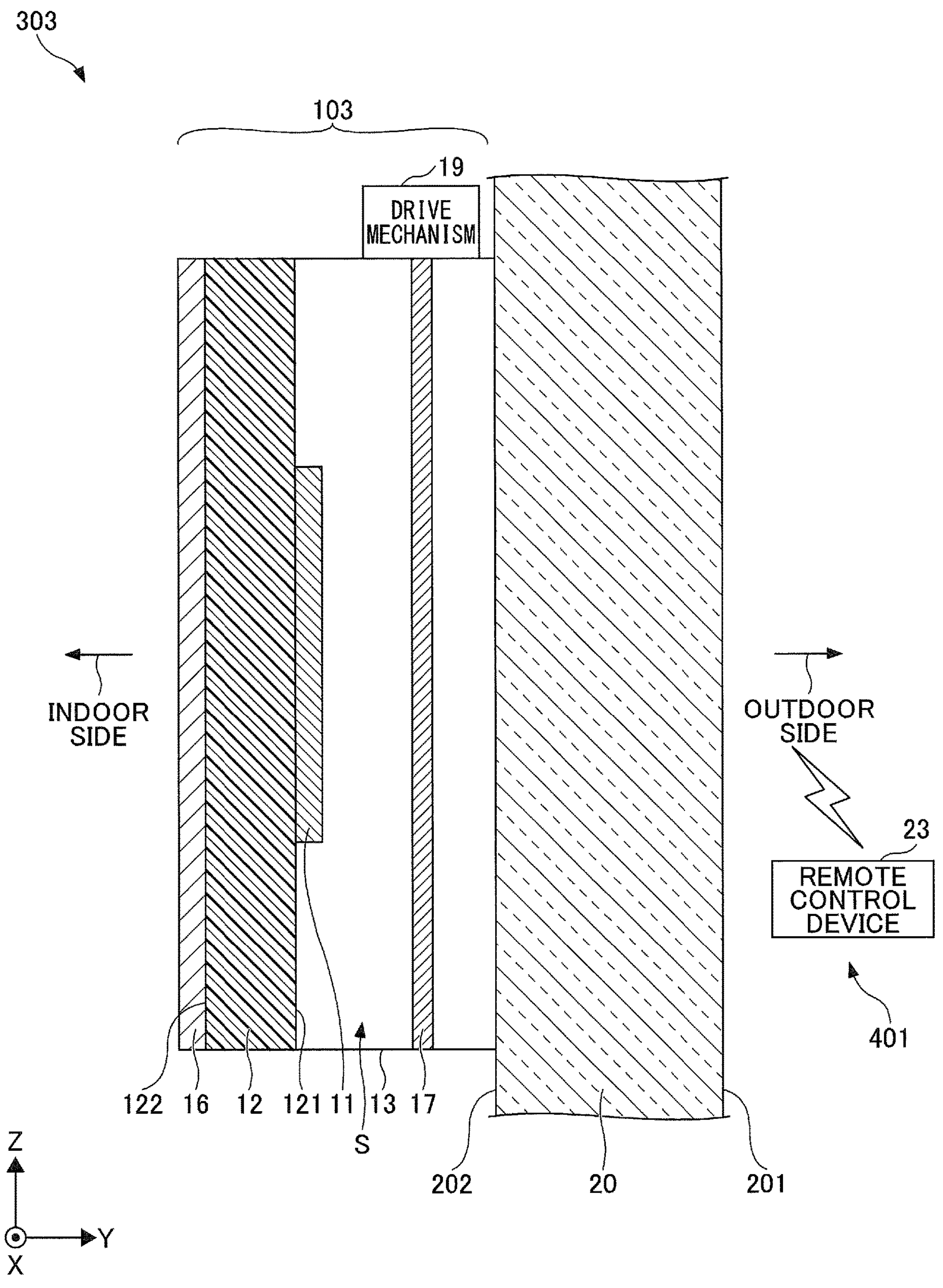
FIG. 3 is a cross-sectional view schematically illustrating an example of a layered configuration of antenna unit-equipped window glass according to a third embodiment.

FIG. 3 is a cross-sectional view schematically illustrating an example of a layered configuration of antenna unit-equipped window glass according to a third embodiment. Antenna unit-equipped window glass 303 illustrated in FIG. 3 includes an antenna unit 103 and the window glass 20. Any description regarding the same configuration or effect as in the above embodiments is omitted or simplified by referring to an aforementioned description.

The embodiment illustrated in FIG. 3 differs from the embodiment in FIG. 1 in that a drive mechanism 19 is included. The antenna units in other embodiments disclosed in this specification may also include the drive mechanism 19. In FIG. 3, an antenna system 401 including the antenna unit 103 equipped with the drive mechanism 19 and a remote control device 23 that wirelessly controls the drive mechanism 19 is illustrated.

The drive mechanism 19 causes the reflective member 17 to move based on a command from the remote control device 23. With this, a person on the outside of the building operates the remote control device 23 to remotely control the location of the reflective member 17 situated on the indoor-side relative to the window glass 20.

For example, when a person on the outside of the building is to begin cleaning the window glass 20, he or she operates the remote control device 23 to send a command the drive mechanism 19 to move the reflective member 17 into the space S. Upon doing so, the drive mechanism 19 performs an operation to cause the reflective member 17 to enter the space S. This ensures that the amount of electromagnetic waves to which the person is exposed is reduced. Also, once the cleaning of the window glass 20 is completed by the person on the outside of the building, the person operates the remote control device 23 to command the drive mechanism 19 to remove the reflective member 17 from the space S. Upon doing so, the drive mechanism 19 performs an operation causing the reflective member 17 to exit the space S. By doing so, even a person on the outside of the building can restore the antenna unit 103 to the regular state in which electromagnetic waves are radiated toward the outside of the building. In this manner, the work efficiency of a person cleaning the window glass 20 on the outside of the building is improved.

The remote control device 23 may be operated by a person indoors in order to control the extraction or insertion of the reflective member 17. Also, in a configuration in which the absorber 18 is included, the drive mechanism 19 may cause the reflective member 17 and the absorber 18 to be moved together.

Figure 4:
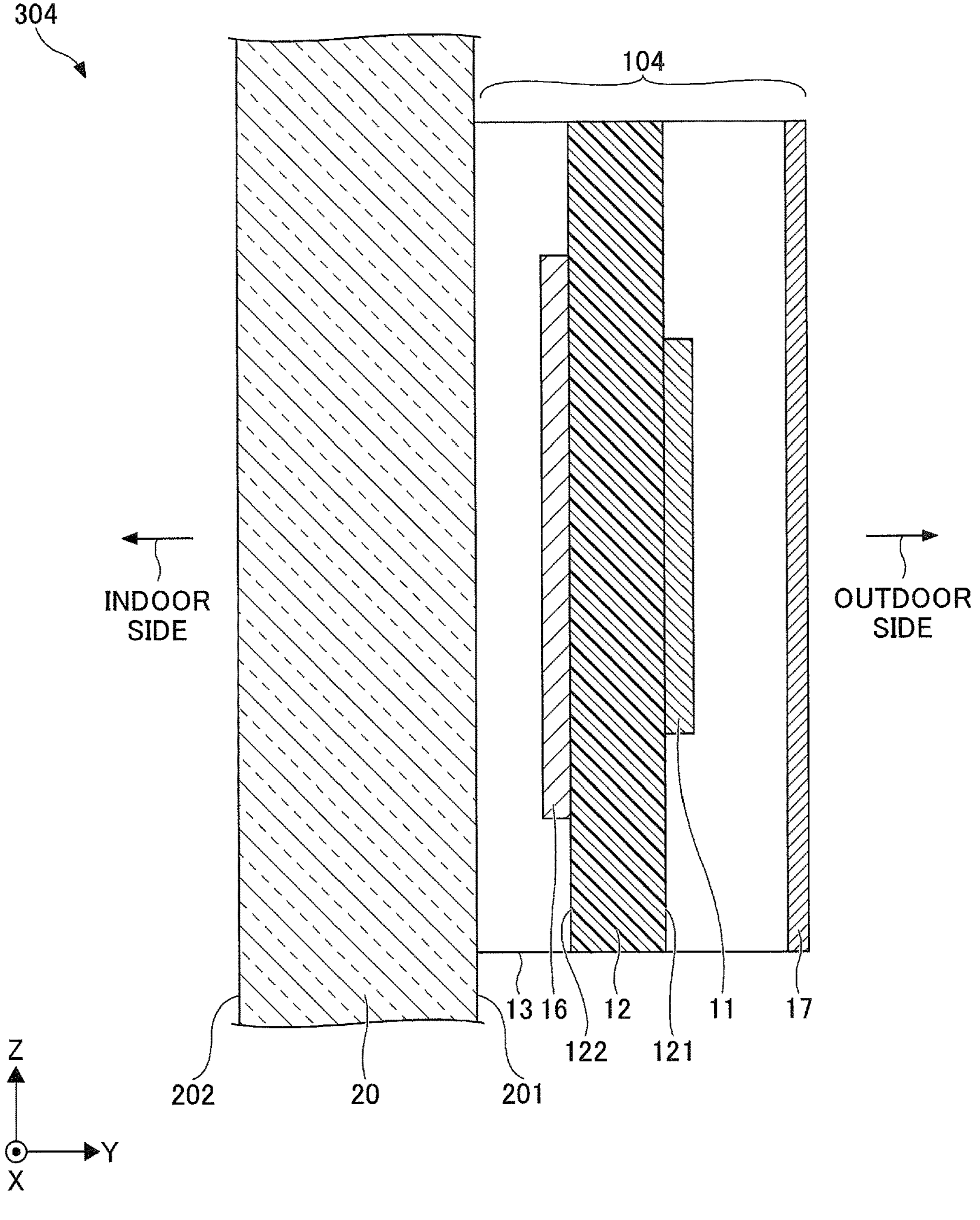
FIG. 4 is a cross-sectional view schematically illustrating an example of a layered configuration of antenna unit-equipped window glass according to a fourth embodiment.

FIG. 4 is a cross-sectional view schematically illustrating an example of a layered configuration of antenna unit-equipped window glass according to a fourth embodiment. Antenna unit-equipped window glass 304 illustrated in FIG. 4 includes an antenna unit 104 and the window glass 20. Any description regarding the same configuration or effect as in the above embodiments is omitted or simplified by referring to an aforementioned description. The embodiment illustrated in FIG. 4 differs from the aforementioned embodiments in that the antenna unit 104 is used by being installed so as to face the outdoor-side surface of the window glass 20 for a building.

The antenna unit 104 includes the radiating element 11, the substrate 12, the conductor 16, the reflective member 17, and the support unit 13, as in the aforementioned embodiments.

The substrate 12 includes the first main surface 121 on which the radiating element 11 is provided, and includes the second main surface 122 on which the conductor 16 is provided.

The reflective member 17, while being supported by the support unit 13 at a predetermined installation location on an outdoor side relative to the radiating element 11, reflects electromagnetic waves radiated toward the outside of the building from the radiating element 11. In the embodiment illustrated in FIG. 4, the installation location is on the outdoor side relative to the substrate 12 (radiating element 11).

The support unit 13 removably supports the reflective member 17 from the predetermined installation location on the outdoor side relative to the radiating element 11. In the embodiment illustrated in FIG. 4, the support unit 13 removably supports the reflective member 17 placed at the installation location on the outdoor side relative to the radiating element 11. For example, the support unit 13 supports the reflective member 17 such that the reflective member 17 is removable from a space that exists in a Z-axis direction, an X-axis direction, or both.

Next, a practical example of an antenna unit according to the present disclosure is described.

Figure 5:
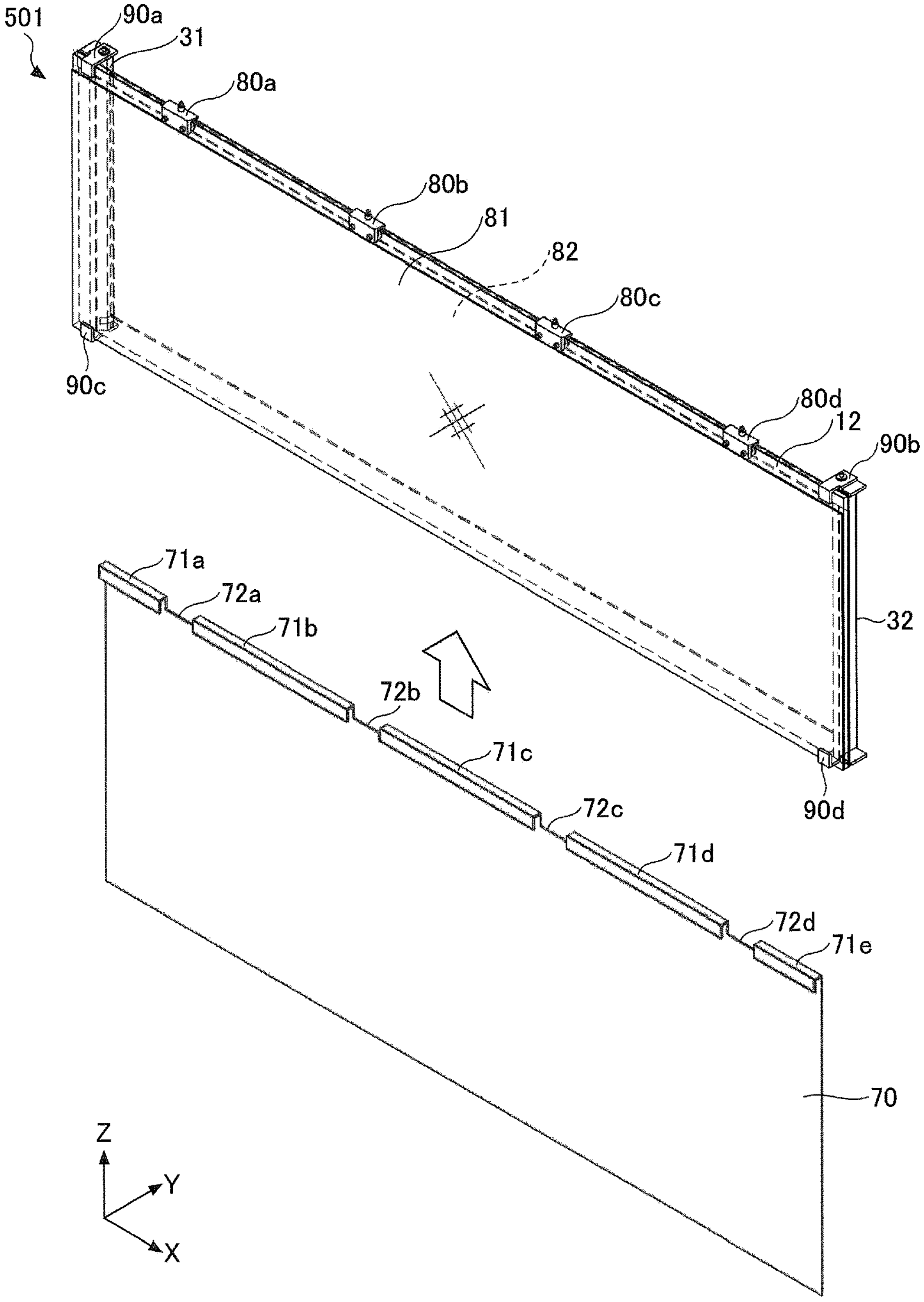
FIG. 5 is a diagram illustrating an example of a method for assembling an antenna unit according to a first practical example.
Figure 6:
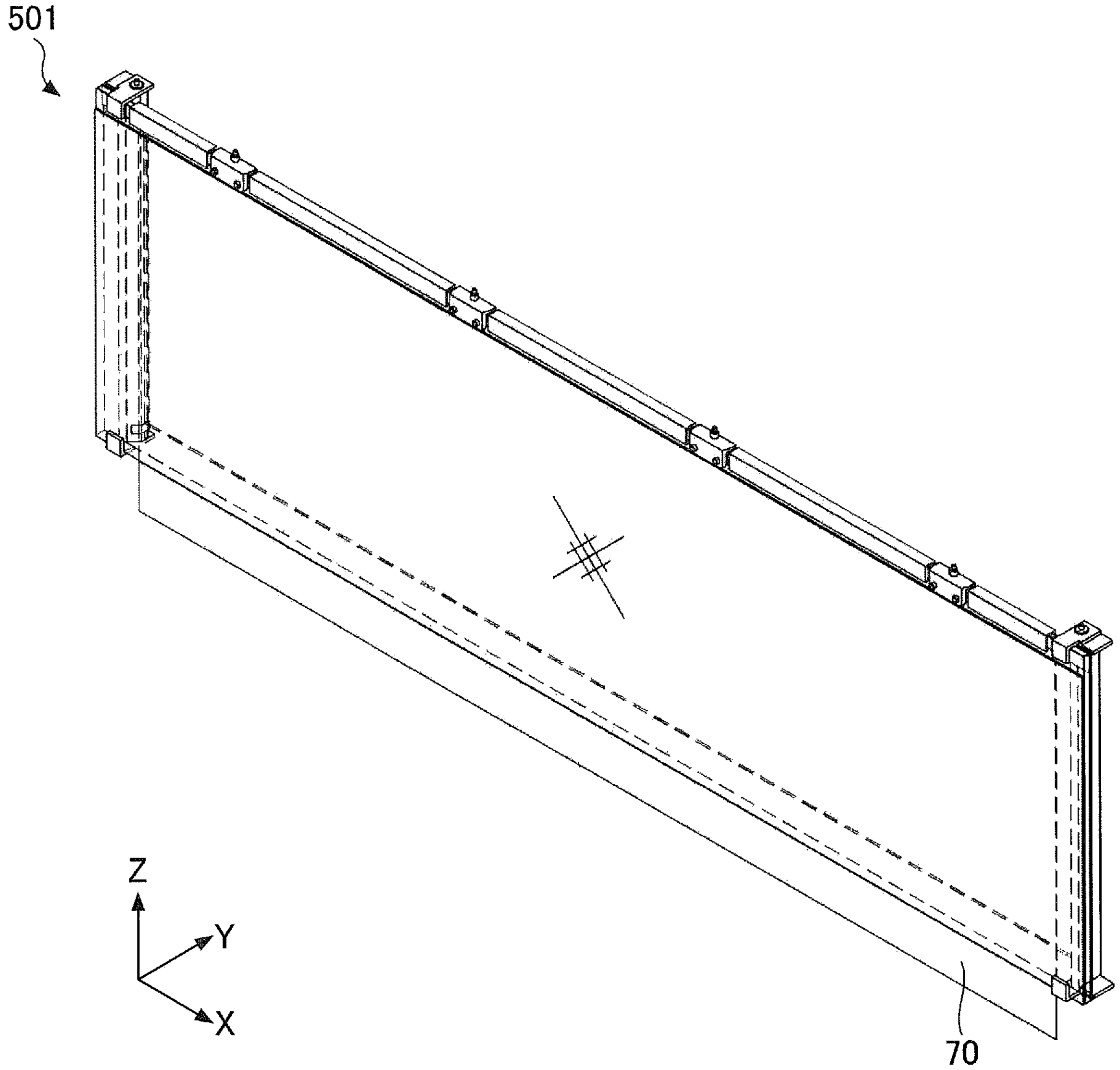
FIG. 6 is a perspective view of the assembled antenna unit according to the first practical example.

FIG. 5 is a diagram illustrating an example of a method for assembling an antenna unit according to a first practical example. FIG. 6 is a perspective view of the assembled antenna unit according to the first practical example. The practical example illustrated in FIGS. 5 and 6 includes a configuration in which a shield member 70 is hung on an antenna unit 501.

The antenna unit 501 is a practical example of the embodiment illustrated in FIG. 1 and FIG. 2. The antenna unit 501 is used by being attached, from the indoor side, to the non-illustrated window glass 20 situated in front of the antenna unit 501 in the Y-axis direction.

The antenna unit 501 includes the substrate 12, a pair of cover glass 81 and 82, a pair of spacers 31 and 32, fasteners *90a* to *90d*, connectors *80a* to *80d*, and a shield member 70.

The shield member 70 may be a member including the aforementioned reflective member 17 or may be a member including both the reflective member 17 and the aforementioned absorber 18.

The aforementioned radiating element 11 is provided on the substrate 12. Both the radiating element 11 and the aforementioned conductor 16 may be provided on the substrate 12. The first cover glass 81 covers the indoor side of the substrate 12 and protects the indoor-side surface of the substrate 12. The second cover glass 82 covers the outdoor side of the substrate 12 and protects the outdoor-side surface of the substrate 12. The pair of spacers 31 and 32 are the aforementioned support unit 13 and support the substrate 12 so as to form between the second cover glass 82 and the non-illustrated window glass a space into which the shield member 70 is to be inserted. The pair of spacers 31 and 32 support the substrate 12 on both the right and left sides of the antenna unit 501. The L-shaped fasteners 90*a* and 90*b* fix the substrate 12 and the pair of cover glass 81 and 82 to the upper portion of the pair of spacers 31 and 32, whereas the L-shaped fasteners 90*c* and 90*d* fix the substrate 12 and the pair of cover glass 81 and 82 to the lower portion of the pair of spacers 31 and 32.

The shield member 70 is removably hung on the upper portion of the antenna unit 501. By hanging the shield member 70 on the upper portion of the antenna unit 501, the shield member 70 is supported by the upper portion.

In the antenna unit 501, the upper portion of the shield member 70 is provided with at least one hook (In FIG. 5, five hooks 71*a* to 71*e*) for hanging the shield member 70 on the upper portion of the antenna unit 501. Also, so that there is no interference with the at least one connector (In FIG. 5, four connectors 80*a* to 80*d*) arranged on the upper portion of the antenna unit 501, at least one notch (In FIG. 5, four notches 72*a* to 72*d*) formed at a location corresponding to the connector is formed on the upper portion of the shield member 70.

Each of the connectors 80*a* to 80*d* is individually connected to a corresponding radiating element among the plurality of radiating elements provided on the substrate 12. The connectors 80*a* to 80*d* are arranged along the top side of the antenna unit 501. The respective top edges of the substrate 12 and the second cover glass 82 are both held by the connectors 80*a* to 80*d*. The shield member 70 hangs by the hooks 71*a* to 71*e* at locations on the upper portion of the antenna unit 501, except for the placement locations of the connectors 80*a* to 80*d*. This ensures that the shield member 70 is removably supported by upper portion of the antenna unit 501.

Figure 7:
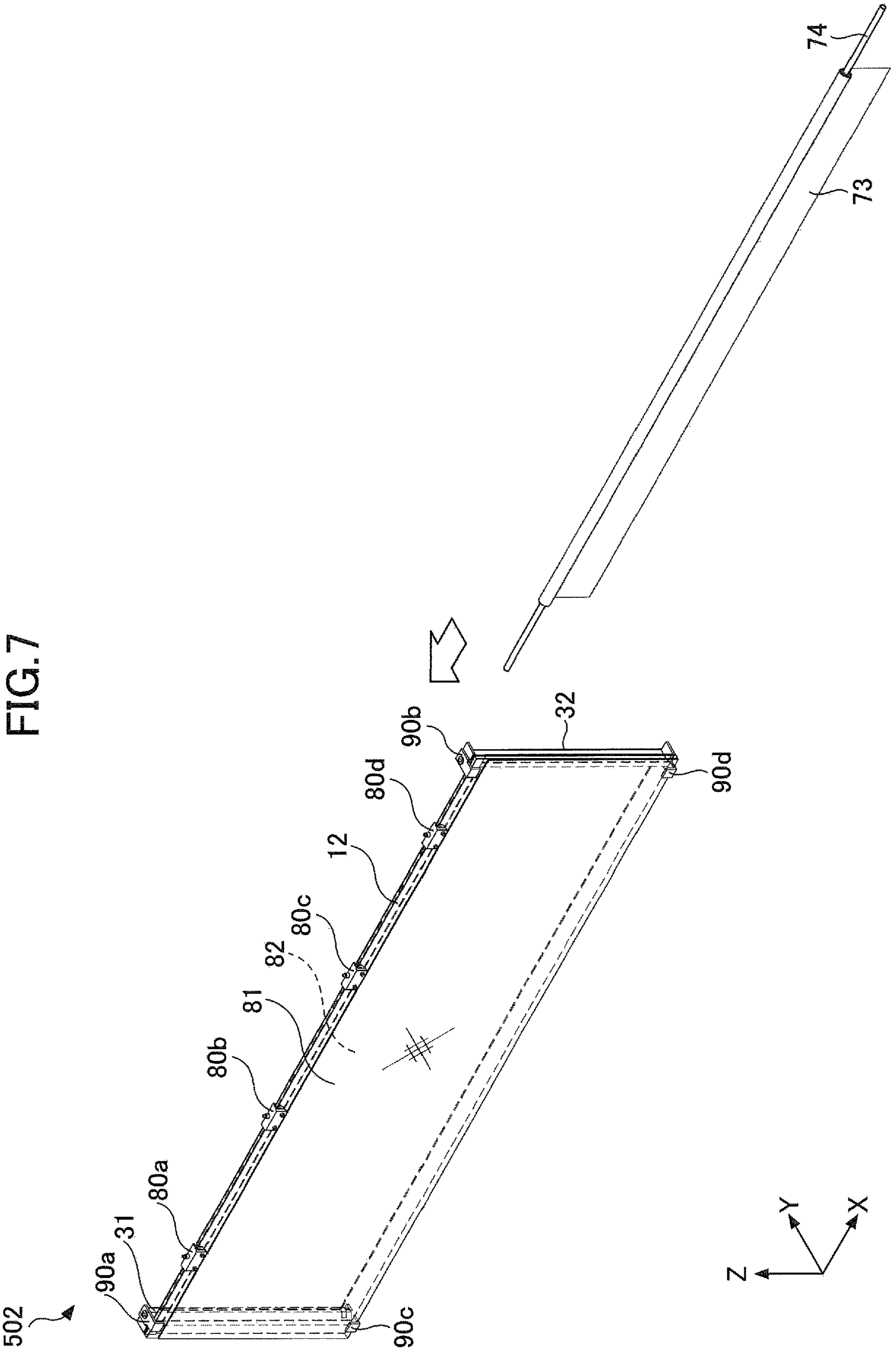
FIG. 7 is a diagram illustrating an example of a method for assembling an antenna unit according to a second practical example.
Figure 8:
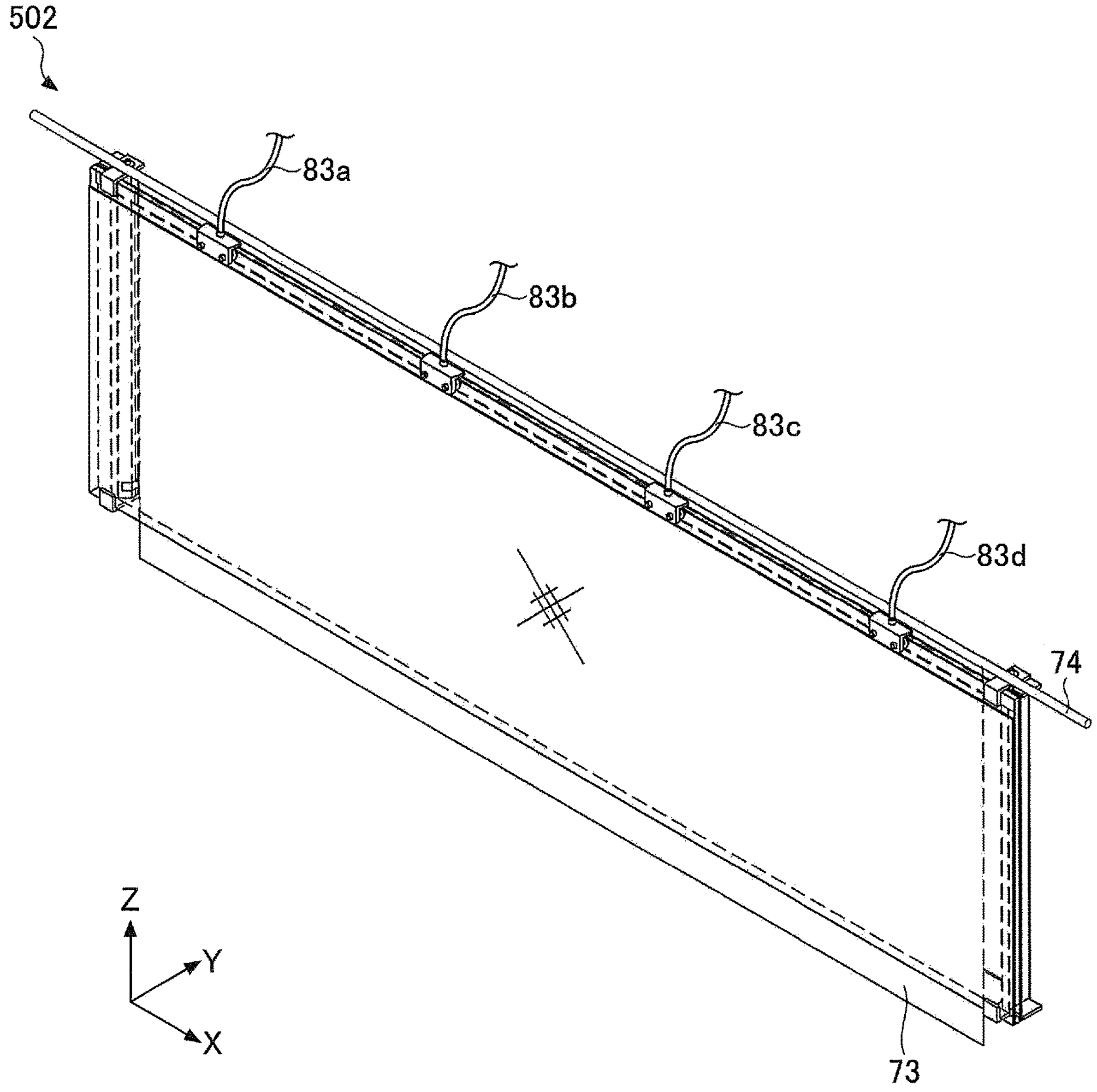
FIG. 8 is a perspective view of the assembled antenna unit according to the second practical example.

FIG. 7 is a diagram illustrating an example of a method for assembling an antenna unit according to a second practical example. FIG. 8 is a perspective view of the assembled antenna unit according to the second practical example. The practical example illustrated in FIGS. 7 and 8 is a configuration in which a core rod 74 with a shield member 73 wound around in a roll shape is placed on an antenna unit 502 and in a case where the electromagnetic waves radiated toward the outside of the building are to be reduced (for example, when the window glass is to be cleaned), the shield member 70 is pulled down. Any description regarding the same configuration or effect as in the above practical example is omitted or simplified by referring to an aforementioned description.

The antenna unit 502 is a practical example of the embodiment illustrated in FIGS. 1, 2, and 3. The antenna unit 502 is used by being attached, from the indoor side, to the non-illustrated window glass 20 situated in front of the antenna unit 502 in the Y-axis direction.

The antenna unit 502 includes the core rod 74 around which the shield member 73 is drawably wound. The core rod 74 is supported by the upper portion of the antenna unit 502. Both ends of the core rod 74 are exposed from the shield member 73, one end being supported by the upper portion of the spacer 31 and the other end being supported by the upper portion of the spacer 32.

Cables 83*a* to 83*d* (refer to FIG. 8) connected to a non-illustrated communication device are connected respectively to the connectors 80*a* to 80*d* arranged on the upper portion of the antenna unit 502. Also, a roll body with the shield member 73 wound around the core rod 74 is placed on the top edge of the antenna unit 502, and in this state, the roll body is situated between the connectors 80*a* to 80*d* and the non-illustrated window glass. Therefore, the roll body is caught by the connectors 80*a* to 80*d* and the non-illustrated window glass even when the core rod 74 of the roll body is not fixed on both sides, and thus the roll body can be prevented from falling off.

Also, it is preferable for the control of drawing down the shield member 73 from the core rod 74 and control of winding up the shield member 73 around the core rod 74 to be achieved by operation of the aforementioned remote control device 23.

Figure 9:
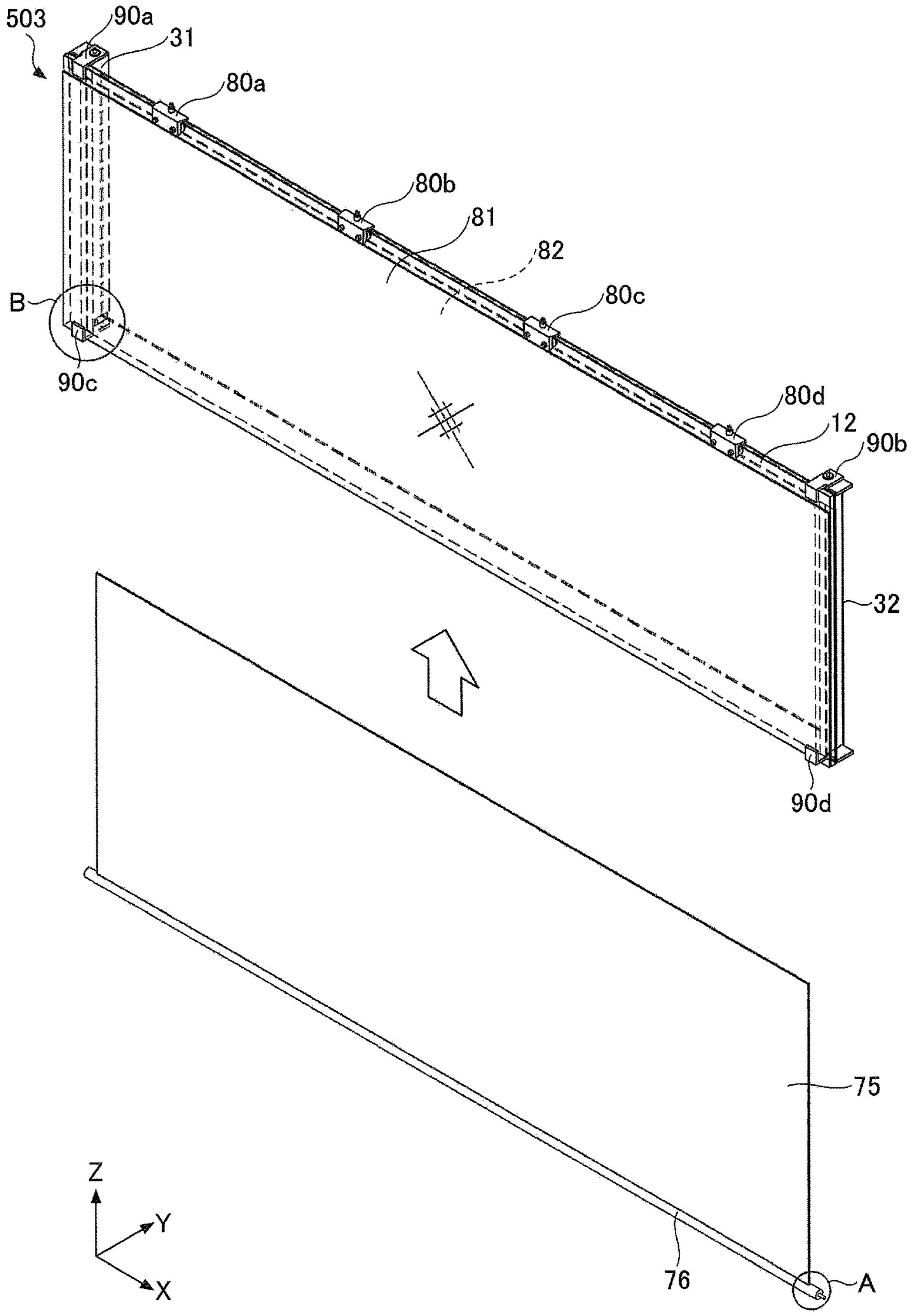
FIG. 9 is a diagram illustrating an example of a method for assembling an antenna unit according to a third practical example.
Figure 10:
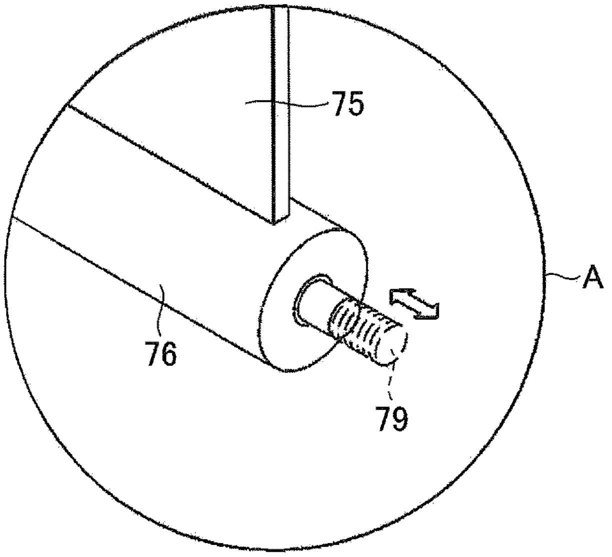
FIG. 10 is a diagram illustrating an enlarged view of portion A illustrated in FIG. 9.
Figure 11:
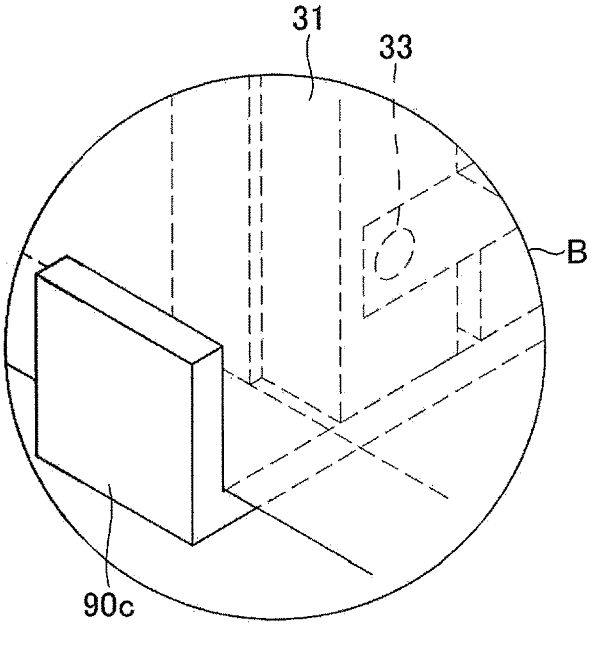
FIG. 11 is a diagram illustrating an enlarged view of portion B illustrated in FIG. 9.
Figure 12:
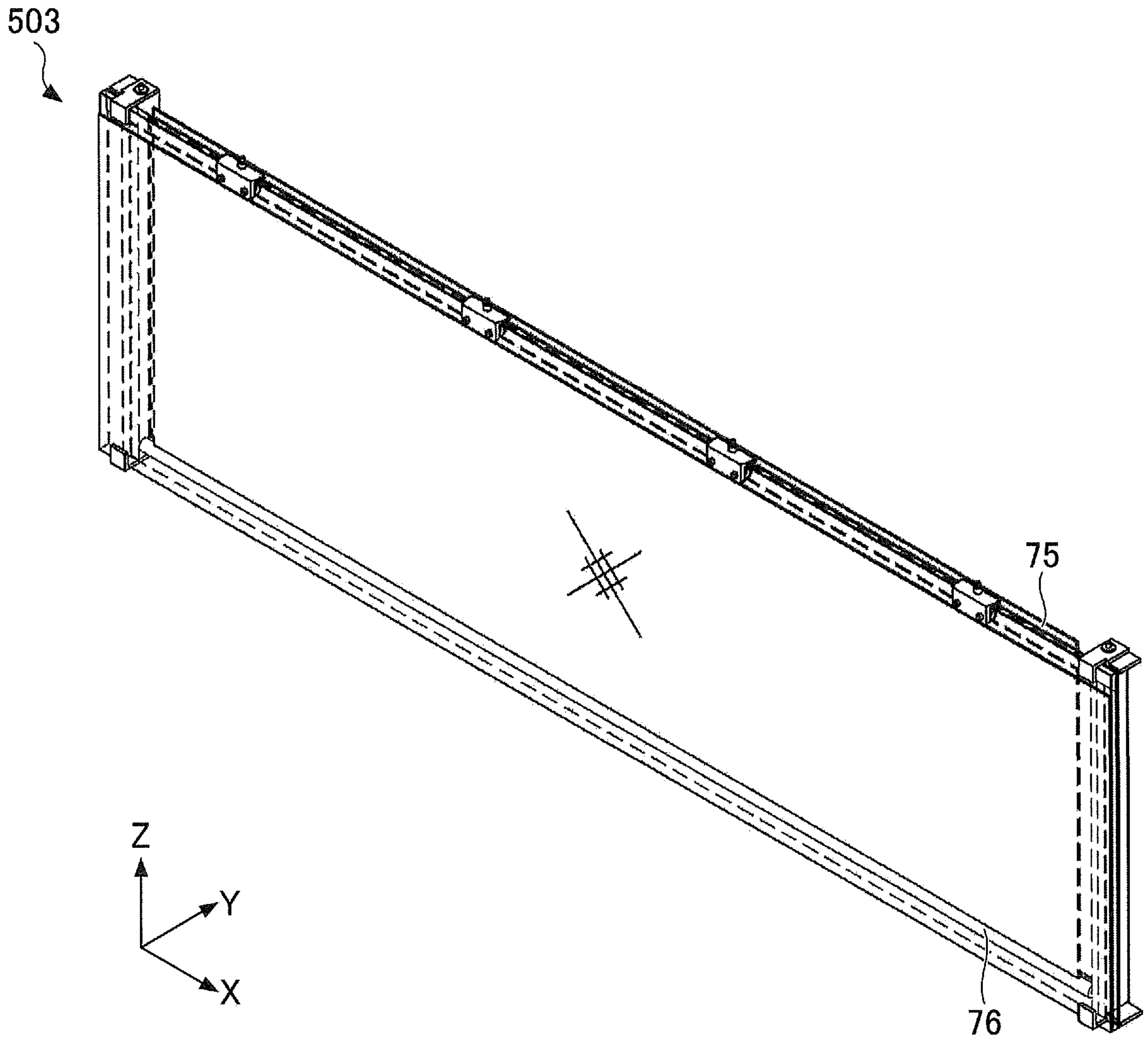
FIG. 12 is a perspective view of the assembled antenna unit according to the third practical example.

FIG. 9 is a diagram illustrating an example of a method for assembling an antenna unit according to a third practical example. FIG. 10 is diagram illustrating an enlarged view of portion A illustrated in FIG. 9. FIG. 11 is a diagram illustrating an enlarged view of portion B illustrated in FIG. 9. FIG. 12 is a perspective view of the assembled antenna unit according to the third practical example. The practical example illustrated in FIGS. 9 to 12 includes a configuration in which a shield member 75 is supported by a support rod 76. Any description regarding the same configuration or effect as in the above practical examples is omitted or simplified by referring to an aforementioned description.

An antenna unit 503 is a practical example of the embodiment illustrated in FIG. 1 and FIG. 2. The antenna unit 503 is used by being attached, from the indoor side, to the non-illustrated window glass 20 situated in front of the antenna unit 503 in the Y-axis direction.

The antenna unit 503 includes a support unit that removably supports a support rod 76 that supports the shield member 75. More specifically, the support unit includes the pair of spacers 31 and 32 that keeps the substrate 12, on which radiating elements are provided at locations apart from the non-illustrated window glass, fixed in place. The spacer 31 is an example of a first fixing unit that keeps the substrate 12 fixed in place, and the spacer 32 is an example of a second fixing unit that keeps the substrate 12 fixed in place. The support rod 76 is a tension rod that is removably installed between the spacer 31 and the spacer 32.

At least one end of the ends on both sides of the support rod 76 is provided with an elastic protrusion 79 so as to function as a tension rod as illustrated in FIG. 10. A groove 33 is formed on a lower portion inner surface of each of the spacers 31 and 32 as illustrated in FIG. 11. The elastic protrusion 79 that extends and retracts in the X-axis direction is inserted into the groove 33. This ensures that the shield member 75 is removably supported by the support rod 76.

Although the groove 33 is formed on the lower portion inner surface of each of the spacers 31 and 32, the groove 33 may be formed on an upper portion inner surface of each of the spacers 31 and 32. The support rod 76 can be detachably attached to the upper portion of the antenna unit 503.

Figure 13:
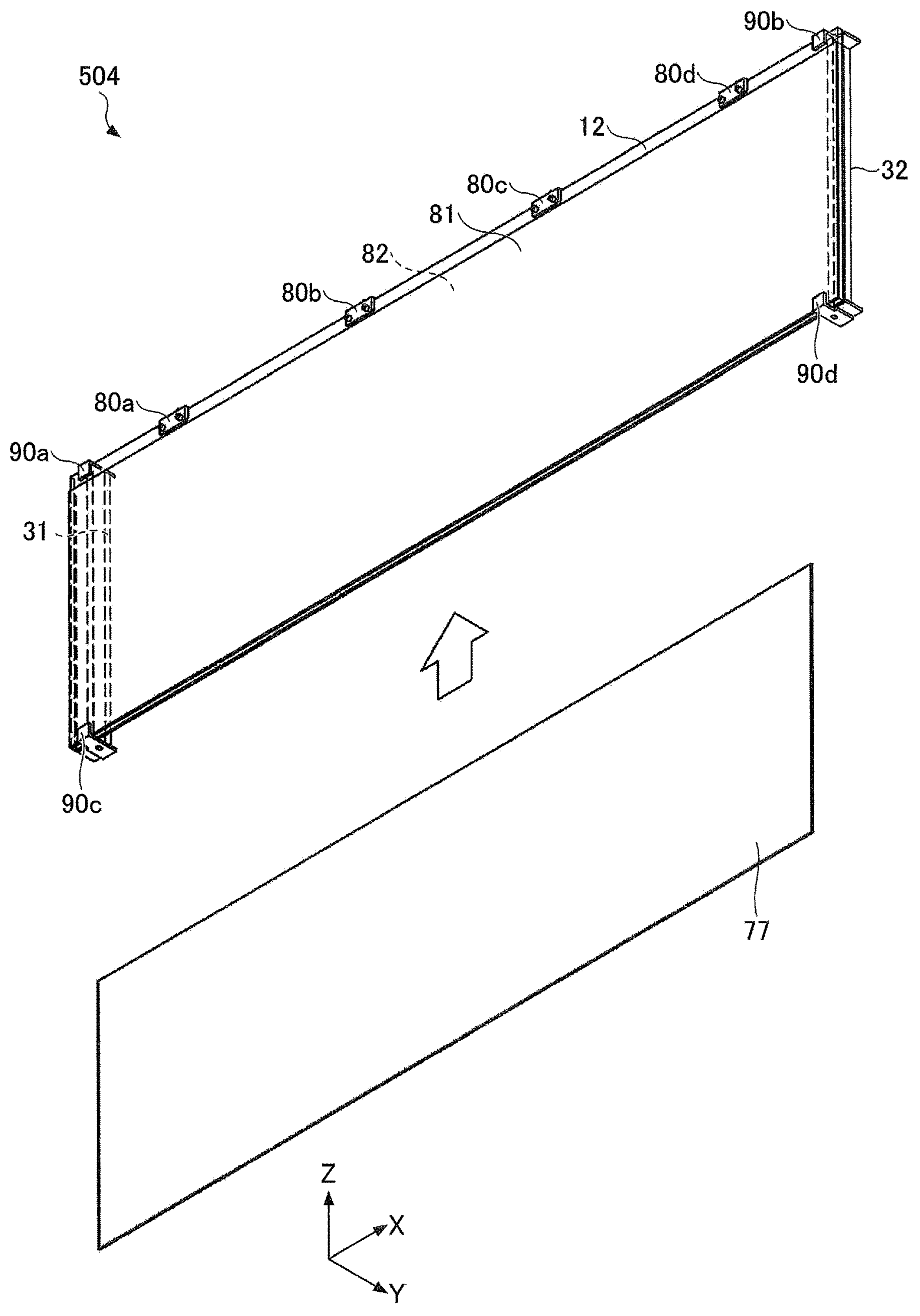
FIG. 13 is a diagram illustrating a method for assembling an antenna unit according to a fourth practical example.
Figure 14:
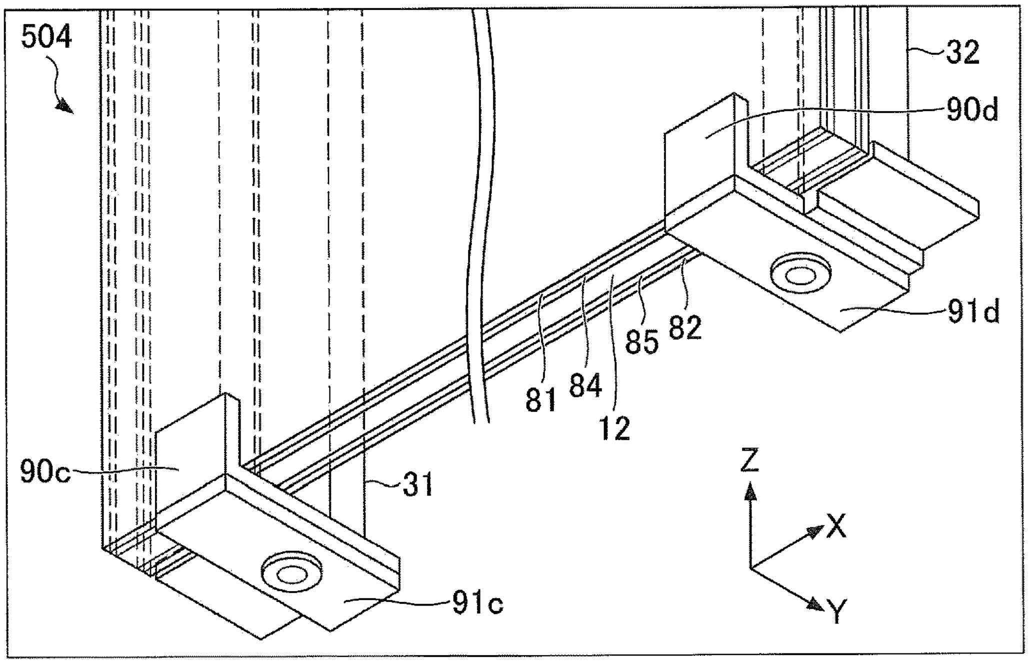
FIG. 14 is a perspective view of the antenna unit according to the fourth practical example during regular operation.
Figure 15:
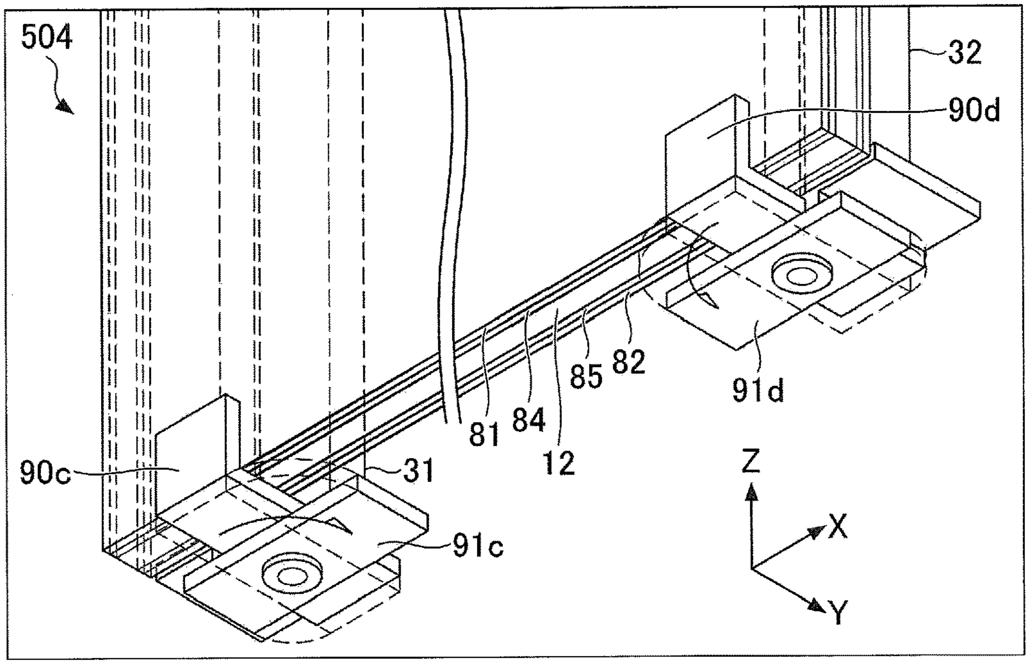
FIG. 15 is a perspective view of the antenna unit according to the fourth practical example during electromagnetic wave blocking.

FIG. 13 is a diagram illustrating a method for assembling an antenna unit according to a fourth practical example. FIG. 14 is a perspective view of the antenna unit according to the fourth practical example during regular operation. FIG. 15 is a perspective view of the antenna unit according to the fourth practical example during electromagnetic wave blocking. The fourth practical example illustrated in FIGS. 13 to 15 includes a stand on which a shield member 77 is placed when electromagnetic wave blocking is to be performed at the time of window washing or the like. Any description regarding the same configuration or effect as in the above practical examples is omitted or simplified by referring to an aforementioned description.

An antenna unit 504 is a practical example of the embodiment illustrated in FIG. 1 and FIG. 2. The antenna unit 504 is used by being attached, from the indoor side, to the non-illustrated window glass 20 situated in front of the antenna unit 504 in the Y-axis direction.

The antenna unit 504 includes a stand on which the shield member 77 is removably placed. FIG. 14 illustrates an example of a rotation stand 91*c* provided on the undersurface of the fastener 90*c* so as to be freely rotatable and a rotation stand 91*d* provided on the undersurface of the fastener 90*d* so as to be freely rotatable, as a stand on which the shield member 77 is temporarily placed. The first cover glass 81 is affixed to one surface of the substrate 12 by an interlayer 84 and the second cover glass 82 is affixed to the other surface of the substrate 12 by an interlayer 85.

In a case where the electromagnetic wave blocking is to be performed at the time of cleaning or the like, the shield member 77 is inserted into the space S from the bottom and the rotation stands 91*c* and 91*d* are rotated as illustrated in FIG. 15. This ensures that the shield member 77 is placed on the rotation stands 91*c* and 91*d*. In a case where the electromagnetic wave blocking by the shield member 77 is to be stopped, the rotation stands 91*c* and 91*d* are reverse rotated so as to be returned to the state in FIG. 14, thereby enabling the shield member 77 to be removed from the space S.

Figure 16:
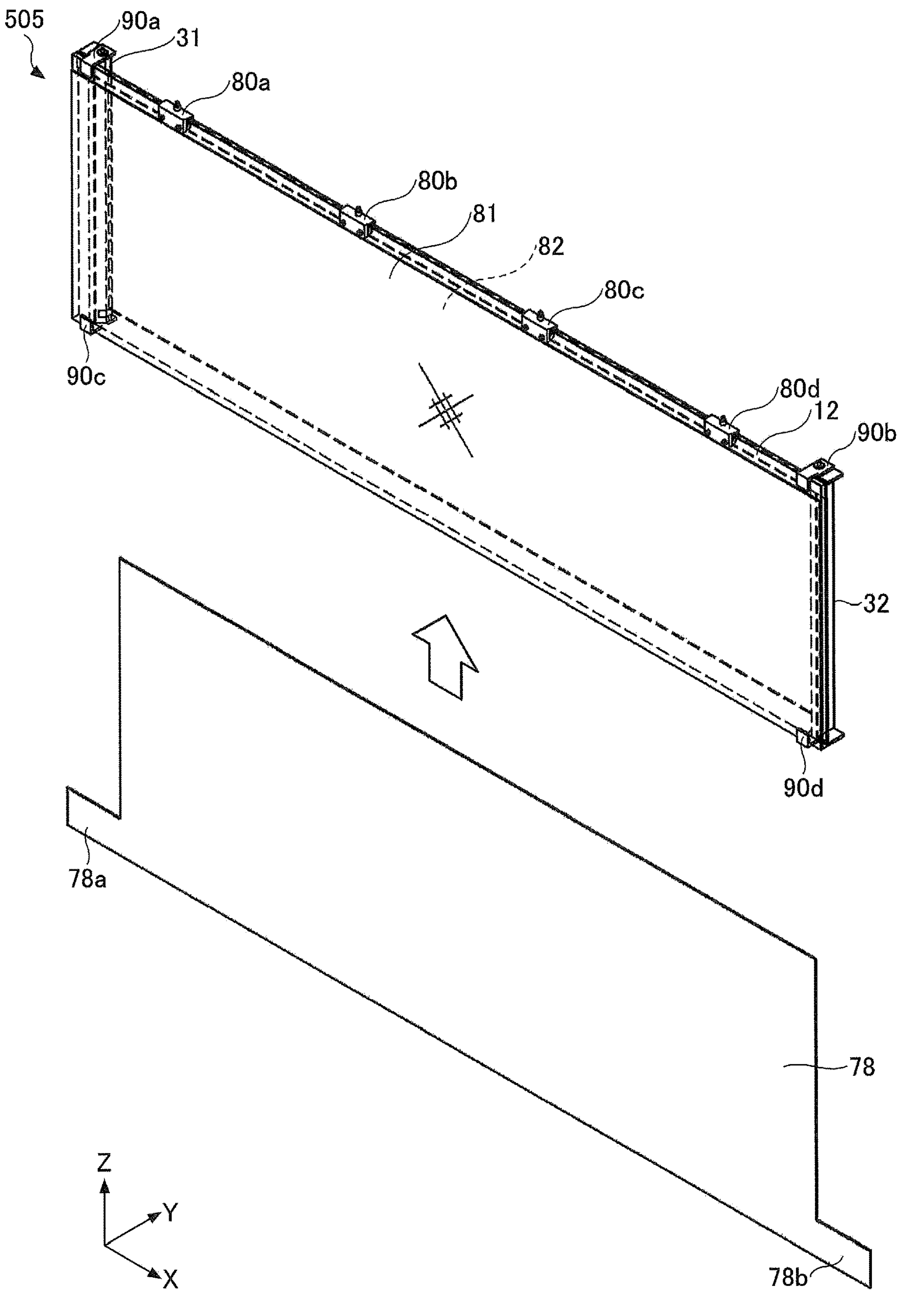
FIG. 16 is a diagram illustrating a method for assembling an antenna unit according to a fifth practical example.
Figure 17:
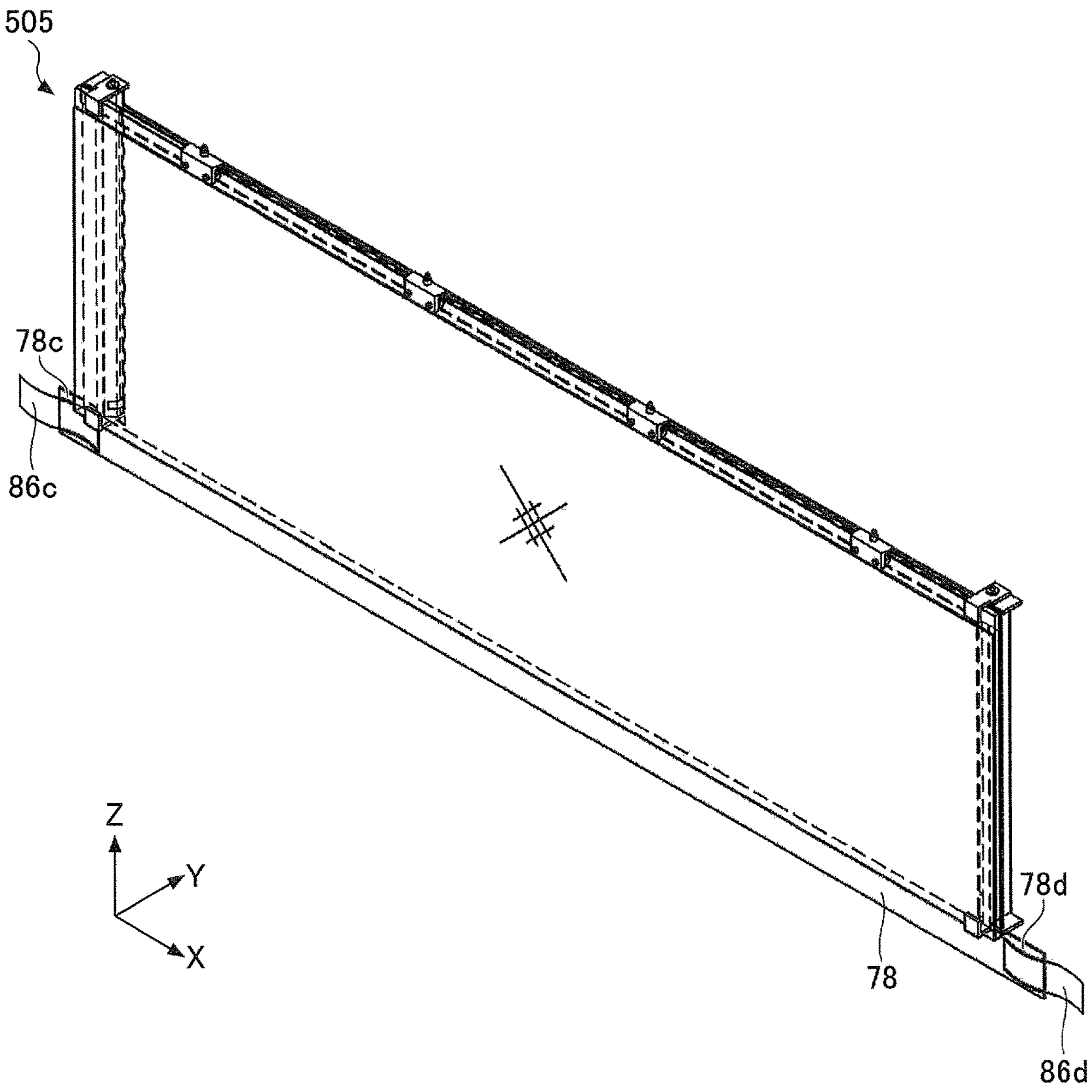
FIG. 17 is a perspective view of the assembled antenna unit according to the fifth practical example.

FIG. 16 is a diagram illustrating a method for assembling an antenna unit according to a fifth practical example. FIG. 17 is a perspective view of the assembled antenna unit according to the fifth practical example. The fifth practical example illustrated in FIGS. 16 and 17 includes a configuration in which a shield member 78 is detachably affixed to the non-illustrated window glass, an antenna unit 505, or both. Any description regarding the same configuration or effect as in the above practical examples is omitted or simplified by referring to an aforementioned description.

The antenna unit 505 is a practical example of the embodiment illustrated in FIG. 1 and FIG. 2. The antenna unit 505 is used by being attached, from the indoor side to the non-illustrated window glass 20 situated in front of the antenna unit 505 in the Y-axis direction.

The shield member 78 includes protruding portions 78*a* and 78*b* that stick out from the antenna unit 505 in the X-axis direction. The protruding portions 78*a* and 78*b* are detachably affixed to the non-illustrated window glass, the antenna unit 505, or both by adhesive members 86*c* and 86*d* such as tape or the like.

Figure 18:
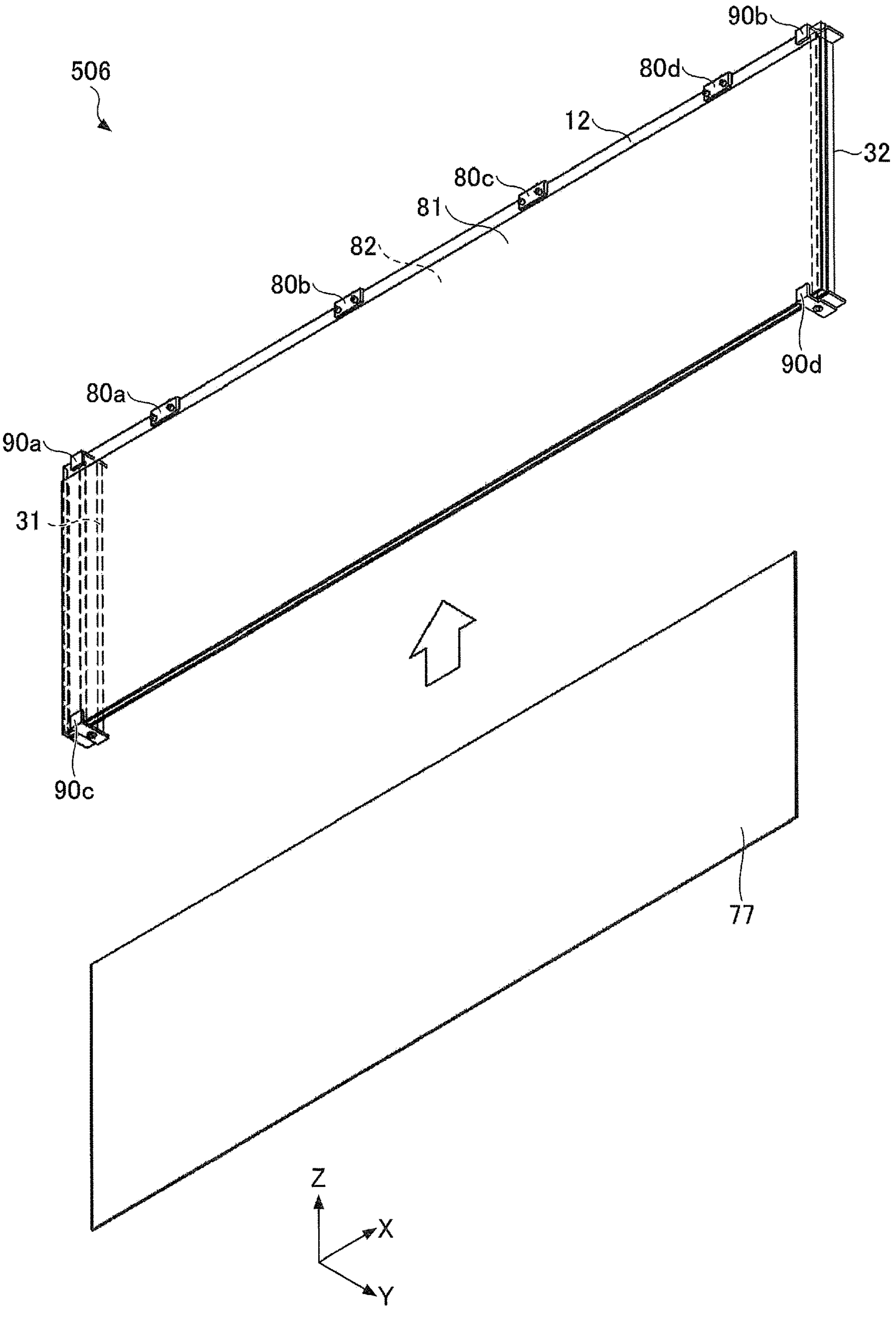
FIG. 18 is a diagram illustrating a method for assembling an antenna unit according to a sixth practical example.
Figure 19:
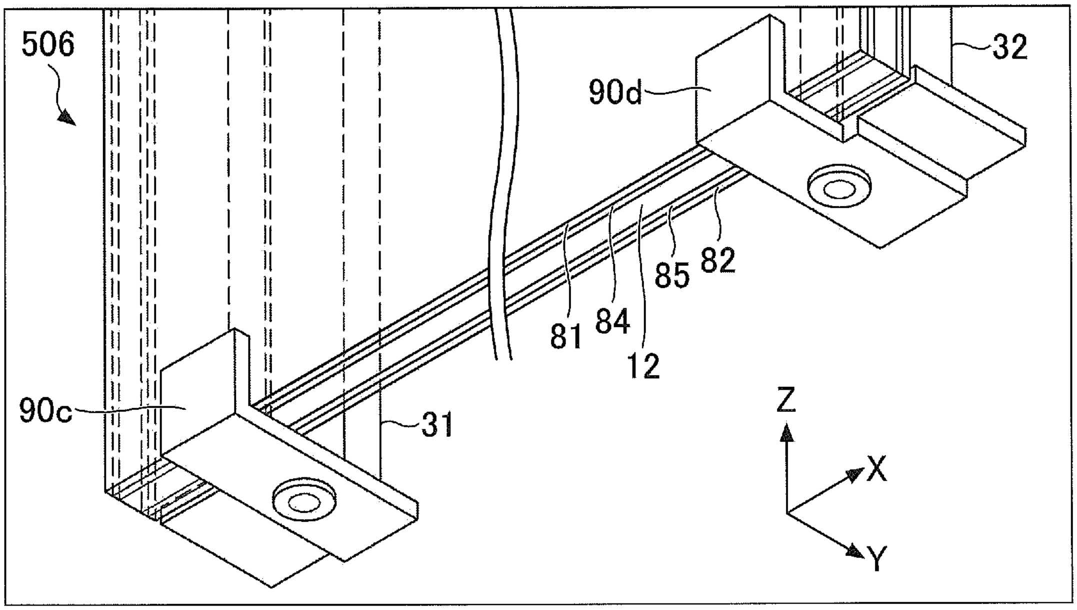
FIG. 19 is a perspective view of the antenna unit according to the sixth practical example during regular operation.
Figure 20:
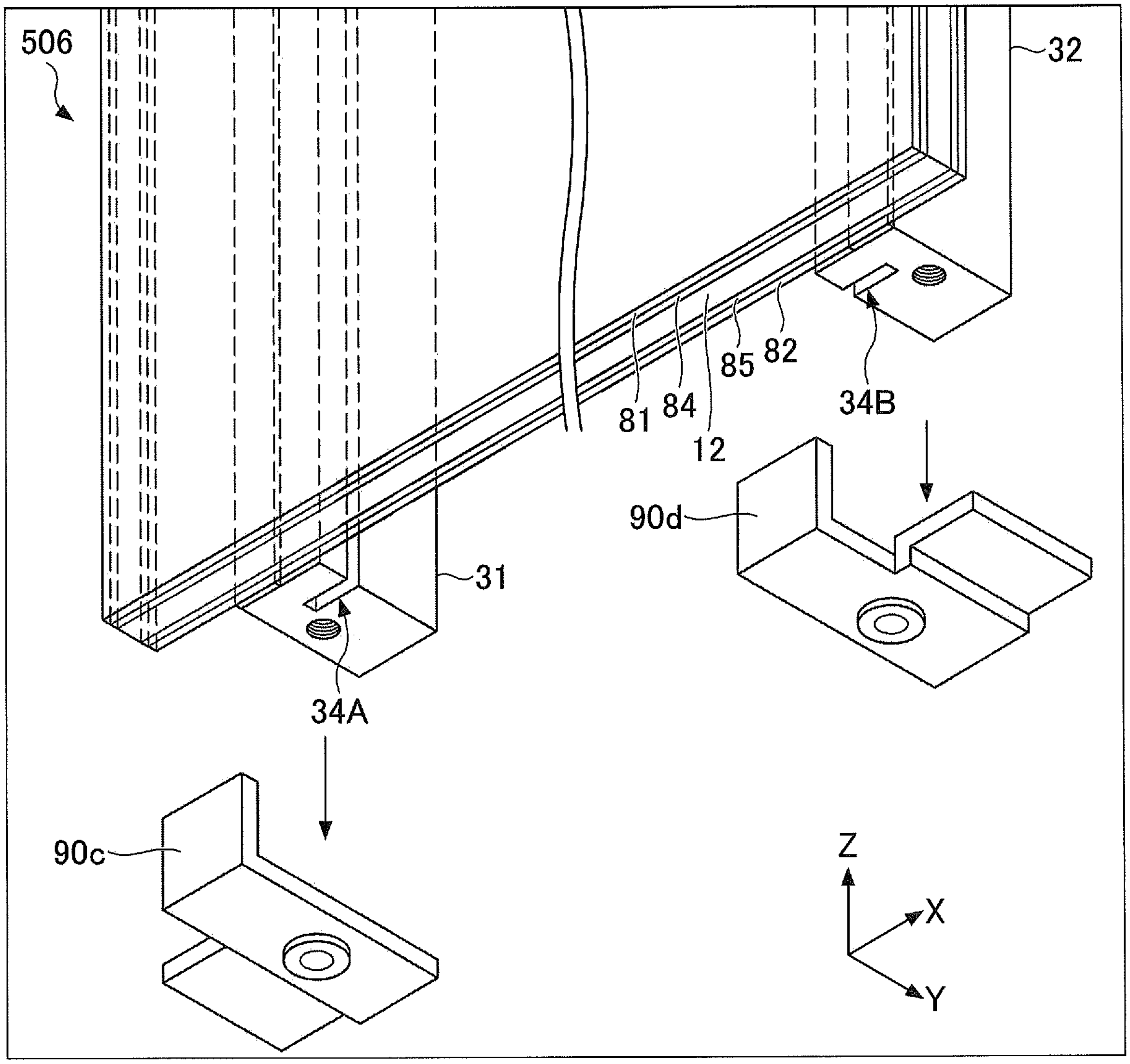
FIG. 20 is a perspective view of the antenna unit according to the sixth practical example during electromagnetic wave blocking.

FIG. 18 is a diagram illustrating a method for assembling an antenna unit according to a sixth practical example. FIG. 19 is a perspective view of the antenna unit according to the sixth practical example during regular operation. FIG. 20 is a perspective view of the antenna unit according to the sixth practical example during electromagnetic wave blocking. The sixth practical example illustrated in FIGS. 18 to 20 includes a configuration in which the shield member 77 is inserted into slits machined in the spacers. Any description regarding the same configuration or effect as in the above practical examples is omitted or simplified by referring to an aforementioned description.

An antenna unit 506 is a practical example of the embodiment illustrated in FIG. 1 and FIG. 2. The antenna unit 506 is used by being attached, from the indoor side, to the non-illustrated window glass 20 situated in front of the antenna unit 506 in the Y-axis direction.

A slit 34A is formed on an inner surface of the spacer 31, whereas a slit 34B is formed on an inner surface of the spacer 32. The shield member 77 is inserted into the slits 34A and 34B.

In a case where electromagnetic wave blocking is to be performed at the time of cleaning or the like, the fasteners 90*c* and 90*d* are removed, the shield member 77 is inserted into the space S from the bottom, and then the fasteners 90*c* and 90*d* are reattached, as illustrated in FIG. 20. This ensures that the shield member 77 is placed on the fasteners 90*c* and 90*d* without falling off. In a case where electromagnetic wave blocking by the shield member 77 is to be stopped, the fasteners 90*c* and 90*d* are removed, the shield member 77 is withdrawn from the bottom of the space S, and then the fasteners 90*c* and 90*d* are reattached. In this manner, the shield member 77 is removably held between the spacer 31 and the spacer 32.

Hereinabove, although the antenna unit and the antenna unit-equipped window glass are described, the present invention is not limited to these embodiments. Various modifications and improvements, such as combinations and replacements with a part or all of another embodiment, can be made within the scope of the invention.

What is claimed is:

1. An antenna unit configured to face window glass of a building, comprising:
- a radiating element configured to radiate electromagnetic waves;
- a reflective member configured to reflect the electromagnetic waves radiated from the radiating element; and
- a support unit configured to removably support the reflective member and be positioned such that the reflective element is positioned to reflect and reduce part of the electromagnetic waves radiated toward outside the building,
- wherein the support unit is configured to form a space between the radiating element and the window glass when the antenna unit is attached to the window glass.

2. The antenna unit according to claim 1, wherein the support unit includes an antenna unit upper portion from which the reflective member hangs.

3. The antenna unit according to claim 2, wherein the antenna unit upper portion includes a connector connected to the radiating element, and the reflective member hangs from the antenna unit upper portion except where the connector is placed.

4. The antenna unit according to claim 1, wherein the support unit includes a core rod around which the reflective member is drawably wound, and includes an antenna unit upper portion configured to support the core rod.

5. The antenna unit according to claim 4, wherein the antenna unit upper portion includes a connector that is connected to the radiating element, and the reflective member wound around the core rod hangs by the connector.

6. The antenna unit according to claim 1, wherein the support unit includes a support rod configured to support the reflective member such that the support unit removably supports the support rod.

7. The antenna unit according to claim 6, wherein the support unit includes a first fixing unit and a second fixing unit configured to keep the radiating element fixed in place at a location apart from the window glass, and the support rod is a tension rod removably installed between the first fixing unit and the second fixing unit.

8. The antenna unit according to claim 1, wherein the support unit includes a stand on which the reflective member is removably placed.

9. The antenna unit according to claim 8, wherein the stand is a rotation stand.

10. The antenna unit according to claim 1, wherein the support unit is configured to detachably affix the reflective member to the window glass, the antenna unit, or a combination thereof.

11. The antenna unit according to claim 1, wherein the support unit is configured to removably hold the reflective member.

12. The antenna unit according to claim 11, wherein the support unit includes a first fixing unit and a second fixing unit configured to keep the radiating element fixed in place at a location apart from the window glass, and the reflective member is removably held between the first fixing unit and the second fixing unit.

13. The antenna unit according to claim 1, wherein the support unit includes a fixing unit configured to keep the radiating element fixed in place at a location apart from the window glass, and the reflective member is removably supported by the fixing unit.

14. The antenna unit according to claim 1, further comprising:

a drive mechanism configured to move the reflective member based on a command from a remote control device.

15. The antenna unit according to claim 1, further comprising:

an absorber positioned between the radiating element and the reflective member such that the absorber absorbs the electromagnetic waves.

16. The antenna unit according to claim 1, further comprising:

a conductor positioned on an indoor side relative to the radiating element.

17. The antenna unit according to claim 1, further comprising:

an absorber positioned between the radiating element and the reflective member such that the absorber absorbs the electromagnetic waves; and a conductor positioned on an indoor side relative to the radiating element.

18. The antenna unit according to claim 1, wherein the reflective member has a surface resistivity of 20 ohms per square or less.

19. The antenna unit according to claim 1, wherein the reflective member has a linear shape.

20. The antenna unit according to claim 1, wherein the support unit is configured to removably support the reflective member between the radiating element and the window glass.

21. An antenna unit-equipped window glass equipped with the antenna unit of claim 1.

22. An antenna unit attachment method, comprising:

installing an antenna unit comprising a radiating element and a support unit such that the antenna unit faces window glass of a building; and supporting a reflective member such that the reflective member is positioned to reflect and reduce part of electromagnetic waves radiated toward outside the building, wherein the radiating element is configured to radiate the electromagnetic waves, the reflective member is configured to reflect the electromagnetic waves radiated from the radiating element, the support unit is configured to removably support the reflective member and positioned such that the reflective element is positioned to reflect and reduce the part of the electromagnetic waves radiated toward outside the building, and the support unit is configured to form a space between the radiating element and the window glass when the antenna unit is attached to the window glass.

23. An antenna unit-equipped window glass equipped with the antenna unit of claim 2.

* * * * *